(12) United States Patent
Lim et al.

(10) Patent No.: US 10,650,596 B2
(45) Date of Patent: May 12, 2020

(54) ELECTRONIC DEVICE FOR PROVIDING VR IMAGE BASED ON POLYHEDRON AND IMAGE PROVIDING METHOD THEREOF

(71) Applicant: SAMSUNG ELECTRONICS CO., LTD., Suwon-si, Gyeonggi-do (KR)

(72) Inventors: Jin Ho Lim, Suwon-si (KR); In Su Yu, Seoul (KR); Il Hoe Jung, Seoul (KR); Byung Po Choi, Suwon-si (KR); Yoon Joo Kim, Seoul (KR); Byung Hyun Ahn, Seoul (KR); Jae Eun Yang, Suwon-si (KR); Dong Hyun Yeom, Bucheon-si (KR)

(73) Assignee: Samsung Electronics Co., Ltd., Suwon-su, Gyeonggi-do (KR)

( * ) Notice: Subject to any disclaimer, the term of this patent is extended or adjusted under 35 U.S.C. 154(b) by 36 days.

(21) Appl. No.: 15/869,399

(22) Filed: Jan. 12, 2018

(65) Prior Publication Data

US 2018/0225876 A1  Aug. 9, 2018

(30) Foreign Application Priority Data

Feb. 6, 2017  (KR) .................. 10-2017-0016440

(51) Int. Cl.
*G06T 19/00* (2011.01)
*G06T 3/00* (2006.01)
(Continued)

(52) U.S. Cl.
CPC ............ *G06T 19/006* (2013.01); *G06F 3/011* (2013.01); *G06T 3/0031* (2013.01); *G06T 15/10* (2013.01);
(Continued)

(58) Field of Classification Search
None
See application file for complete search history.

(56) References Cited

U.S. PATENT DOCUMENTS 5,912,670 A * 6/1999 Lipscomb ............... G06T 15/10
345/419
9,083,968 B2  7/2015 Kim
(Continued)

FOREIGN PATENT DOCUMENTS

CN  101917391 A  12/2010
CN  102377875 A  3/2012
(Continued)

OTHER PUBLICATIONS

Extended Search Report dated Jun. 27, 2018 in counterpart European Patent Application No. 18155111.0.
(Continued)

*Primary Examiner* — Ke Xiao
*Assistant Examiner* — Jed-Justin Imperial
(74) *Attorney, Agent, or Firm* — Nixon & Vanderhye P.C.

(57) ABSTRACT

An electronic device is provided. The electronic device includes a communication module comprising communication circuitry, a memory configured to store first information indicating first image data generated using a first rendering scheme based on a first polyhedron configured with a first number of surfaces and second information indicating second image data generated using a second rendering scheme based on a second polyhedron configured with a second number of surfaces, and a processor. The processor is configured to verify state information of the electronic device, to select one of the first information and the second information based on the at least state information, to transmit a request corresponding to the selected information to an external electronic device via the communication module, to receive image data corresponding to the selected information between the first image data and the second image data from the external electronic device in response to
(Continued)

the request, and to control playback of the received image data.

20 Claims, 28 Drawing Sheets

(51) Int. Cl.
| | |
|---|---|
| *H04N 19/20* | (2014.01) |
| *G06F 3/01* | (2006.01) |
| *G06T 15/10* | (2011.01) |
| *H04N 19/136* | (2014.01) |
| *G02B 27/01* | (2006.01) |

(52) U.S. Cl.
CPC .............. *G06T 19/00* (2013.01); *H04N 19/20* (2014.11); *G02B 27/017* (2013.01); *H04N 19/136* (2014.11)

(56) References Cited

U.S. PATENT DOCUMENTS

| | | | |
|---|---|---|---|
| 10,237,548 | B2 | 3/2019 | Korneliussen et al. |
| 10,516,714 | B2 | 12/2019 | Budzisz et al. |
| 2011/0050699 | A1* | 3/2011 | Dawson .................. G06T 15/00 345/428 |
| 2016/0005229 | A1* | 1/2016 | Lee ....................... G06F 3/0488 345/419 |
| 2016/0073173 | A1 | 3/2016 | Na et al. |
| 2016/0112704 | A1 | 4/2016 | Grange et al. |
| 2016/0112713 | A1 | 4/2016 | Russell |
| 2016/0150212 | A1 | 5/2016 | Moura et al. |
| 2016/0156912 | A1 | 6/2016 | Alshina et al. |
| 2016/0277772 | A1* | 9/2016 | Campbell ........ H04N 21/21805 |

FOREIGN PATENT DOCUMENTS

| | | |
|---|---|---|
| CN | 103077552 A | 5/2013 |
| CN | 105049862 A | 11/2015 |
| CN | 106060570 A | 10/2016 |
| CN | 106204704 A | 12/2016 |
| WO | WO 2016 118897 | 7/2016 |

OTHER PUBLICATIONS

Choi, K et al., "Test sequence formats for virtual reality video coding", 3. JVET Meeting; May 26, 2016-Jun. 1, 2016; Geneva; (The Joint Video Explgration Team of ISO/IEC JTC1/SC29/WG11 and ITU-T SG.16); URL: HTTP://PHENIX.INT-EVRY.FR/JVET/ no. JVET-00050, May 25, 2016, pp. 1-6, XP030150147.

Vishwanath, B et al., "AHG8: Suggested test methodology for evaluating projection formats for 360 video coding", 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet No. JVET-D0074, Oct. 6, 2016, pp. 1-11, XP030150307.

Kammachi-Sreedhar, K et al., "Viewport-Adaptive Encoding and Streaming of 360-Degree Video for Virtual Reality Applications", 2016 IEEE International Symposium on Multimedia (ISM), IEEE, Dec. 11, 2016, pp. 583-586, XP033048306.

Chinese Office Action dated Dec. 31, 2019 for CN Application No. 201922602519130.

* cited by examiner (a)            (b)

(c)   (d)

ELECTRONIC DEVICE FOR PROVIDING VR IMAGE BASED ON POLYHEDRON AND IMAGE PROVIDING METHOD THEREOF

CROSS-REFERENCE TO RELATED APPLICATION

This application is based on and claims priority under 35 U.S.C. § 119 to a Korean patent application filed on Feb. 6, 2017 in the Korean Intellectual Property Office and assigned Serial number 10-2017-0016440, the disclosure of which is incorporated by reference herein in its entirety.

TECHNICAL FIELD

The present disclosure relates generally to an electronic device for providing an omnidirectional image (or a virtual reality (VR) image) based on a polyhedron and a method for providing the image.

BACKGROUND

Virtual reality (VR) may refer to any specific environment or situation which is similar to reality made using artificial technology which uses an electronic device, but is not true reality. Users have sensory experience similar to reality by feeling using a sense organ through VR and interacting.

An omnidirectional image should be captured to implement VR. VR technology may be implemented by playing back an omnidirectional image on a display device such as a smartphone or a tablet personal computer (PC). VR may be implemented using a wearable device (e.g., a head mounted display (HMD)).

An omnidirectional image for implementing VR may be transmitted from an electronic device which captures the omnidirectional image to another electronic device.

An omnidirectional image may be an image in which an omnidirectional subject is captured around a captured point and may have higher capacity than an image generated by capturing only a specified range. Thus, if an electronic device receives and plays back an omnidirectional image in real time, streaming of the omnidirectional image may fail to be smoothly performed according to a state where the electronic device processes an image and a state where the electronic device is connected to a network.

A three-dimensional (3D) omnidirectional image may be mapped to a two-dimensional (2D) plane to be transmitted to transmit the omnidirectional image to another electronic device. Thus, the omnidirectional image may vary in capacity according to a manner mapped to the 2D plane.

SUMMARY

Example aspects of the present disclosure address at least the above-mentioned problems and/or disadvantages and provide at least the advantages described below. Accordingly, an example aspect of the present disclosure is to provide an electronic device for changing a method of arranging an omnidirectional image on a two-dimensional (2D) plane depending on a state where the electronic device processes an image and a state where the electronic device is connected to a network and smoothly transmitting the omnidirectional image and an image providing method thereof.

In accordance with an example aspect of the present disclosure, an electronic device is provided. The electronic device may include a communication module comprising communication circuitry, a memory configured to store first information indicating first image data generated using a first rendering scheme based on a first polyhedron configured with a first number of surfaces and second information indicating second image data generated using a second rendering scheme based on a second polyhedron configured with a second number of surfaces, and a processor. The processor may be configured to verify state information of the electronic device, select one of the first information and the second information based on at least the state information, to transmit a request corresponding to the selected information to an external electronic device via the communication module, to receive image data corresponding to the selected information between the first image data and the second image data from the external electronic device in response to the request, and to control playback of the received image data.

In accordance with another example aspect of the present disclosure, an image providing method is provided. The method may include verifying state information of an electronic device, selecting one of first information indicating first image data generated using a first rendering scheme based on a first polyhedron configured with a first number of surfaces and second information indicating second image data generated using a second rendering scheme based on a second polyhedron configured with a second number of surfaces based at least on state information of the electronic device, transmitting a request corresponding to the selected information to an external electronic device via a communication module of the electronic device, receiving image data corresponding to the selected information between the first image data and the second image data from the external electronic device in response to the request, and controlling playback of the received image data.

In accordance with another example aspect of the present disclosure, a storage medium is provided. The storage medium may include instructions, which when executed by a processor, cause an electronic device to perform operations including verifying state information of an electronic device, selecting one of first information indicating first image data generated using a first rendering scheme based on a first polyhedron configured with a first number of surfaces and second information indicating second image data generated using a second rendering scheme based on a second polyhedron configured with a second number of surfaces based at least on the state information, transmitting a request corresponding to the selected information to an external electronic device via a communication module of the electronic device, receiving image data corresponding to the selected information between the first image data and the second image data from the external electronic device in response to the request, and controlling playback of the received image data.

An electronic device for processing an image and a control method thereof may efficiently transmit an omnidirectional image by selecting a polyhedron to which an omnidirectional image will be mapped, based on information about a state of the electronic device where the electronic device processes an image and a state of the electronic device where the electronic device is connected to a network and mapping the omnidirectional image to the selected polyhedron to generate an image.

Further, the electronic device and the control method thereof may efficiently transmit an omnidirectional image by decreasing an image mapped to a plurality of surfaces of a polyhedron depending on a field of view (FOV) determined based on a line of sight of a user and arranging the decreased image on a 2D plane to generate an image.

In addition, a variety of effects directly or indirectly ascertained through the present disclosure may be provided.

Other aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and attendant advantages of various example embodiments of the present disclosure will be more apparent and readily appreciated from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
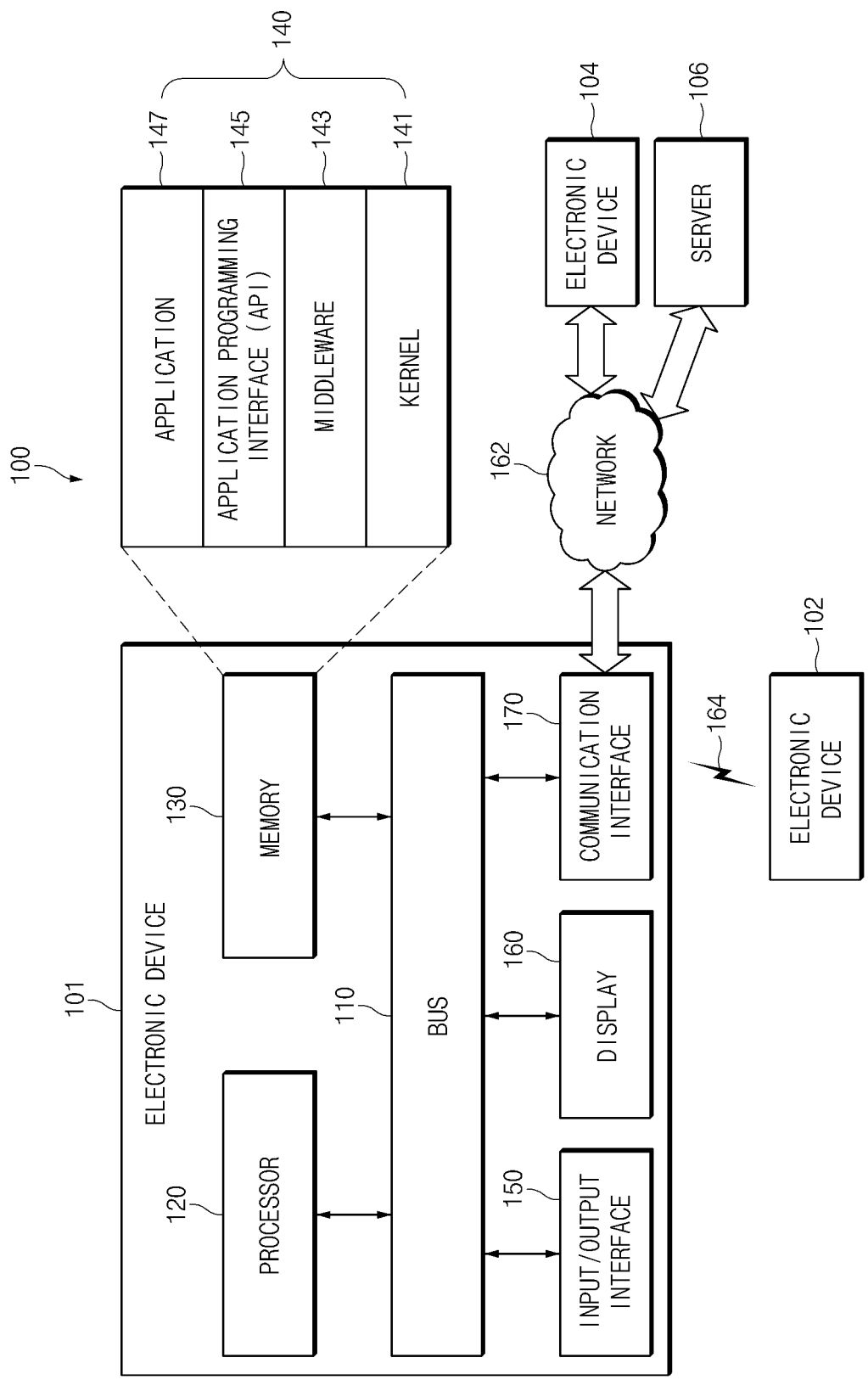
FIG. 1 is a block diagram illustrating an example configuration of an electronic device in a network environment according to various example embodiments of the present disclosure.

Hereinafter, various example embodiments of the present disclosure may be described with reference to accompanying drawings. Accordingly, those of ordinary skill in the art will recognize that modifications, equivalents, and/or alternatives of the various embodiments described herein can be variously made without departing from the scope and spirit of the present disclosure. With regard to description of drawings, similar elements may be marked by similar reference numerals. The terms of a singular form may include plural forms unless otherwise specified. In this disclosure, the expressions "A or B", "at least one of A or/and B", or "one or more of A or/and B", and the like may include any and all combinations of one or more of the associated listed items. The terms, such as "first", "second", and the like may be used to refer to various elements regardless of the order and/or the priority and to distinguish the relevant elements from other elements, but do not limit the elements. When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present.

According to the situation, the expression "configured to" used in this disclosure may be used as, for example, the expression "suitable for", "having the capacity to", "adapted to", "made to", "capable of", or "designed to" in hardware or software. The expression "a device configured to" may refer to a situation in which the device is "capable of" operating together with another device or other components. For example, a "processor configured to (or set to) perform A, B, and C" may refer, for example, and without limitation, to a dedicated processor (e.g., an embedded processor) for performing a corresponding operation, a generic-purpose processor (e.g., a central processing unit (CPU) or an application processor) which performs corresponding operations by executing one or more software programs which are stored in a memory device, or the like.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, medical devices, cameras, or wearable devices, or the like, but is not limited thereto. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit), or the like, but is not limited thereto. According to various embodiments, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, or the like, but is not limited thereto.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automatic teller's machines (ATMs), points of sales (POSs) of stores, or internet of things (e.g., light bulbs, various sensors, sprinkler devices, fire alarms, thermostats, street lamps, toasters, exercise equipment, hot water tanks, heaters, boilers, and the like), or the like, but is not limited thereto. According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like), or the like, but is not limited thereto. According to various embodiments, the electronic device may be a flexible electronic device or a combination of two or more above-described devices. Furthermore, an electronic device according to an embodiment of this disclosure may not be limited to the above-described electronic devices. In this disclosure, the term "user" may refer to a person who uses an electronic device or may refer to a device (e.g., an artificial intelligence electronic device) that uses the electronic device.

FIG. 1 is a diagram illustrating an example electronic device in a network environment, according to various example embodiments of the present disclosure.

Referring to FIG. 1, according to various embodiments, an electronic device 101 in a network environment 100 is described. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to an embodiment, the electronic device 101 may not include at least one of the above-described elements or may further include other element(s).

The bus 110 may interconnect the above-described elements 110 to 170 and may include a circuit for conveying communications (e.g., a control message and/or data) among the above-described elements.

The processor 120 may include various processing circuitry, such as, for example, and without limitation, one or more of a dedicated processor, a central processing unit (CPU), an application processor (AP), a communication processor (CP), or the like. For example, the processor 120 may perform an arithmetic operation or data processing associated with control and/or communication of at least other elements of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)". For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data. Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147 and may process the one or more task requests. The API 145 may be an interface through which the application program 147 controls a function provided by the kernel 141 or the middleware 143, and may include, for example, at least one interface or function (e.g., an instruction) for a file control, a window control, image processing, a character control, or the like.

The input/output interface 150 may include various input/output circuitry and transmit an instruction or data input from a user or another external device, to other element(s) of the electronic device 101 or may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display, or the like, but is not limited thereto. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

The communication interface 170 may establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106). The communication interface 170 may establish a short-range wireless communication connection 164 with an external device, such as, for example, and without limitation the first electronic device 102.

For example, the wireless communication may include cellular communication using at least one of long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. The wireless communication may include at least one of wireless fidelity (Wi-Fi), light fidelity (LiFi), Bluetooth, Bluetooth low energy (BLE), Zigbee, near field communication (NFC), magnetic stripe transmission (MST), radio frequency (RF), a body area network, or the like. According to an embodiment, the wireless communication may include GNSS. The GNSS may be one of, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), powerline communication, a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to various embodiments, all or a portion of operations that the electronic device 101 will perform may be executed by another or plural electronic devices (e.g., the first electronic device 102, the second electronic device 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 at other electronic device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
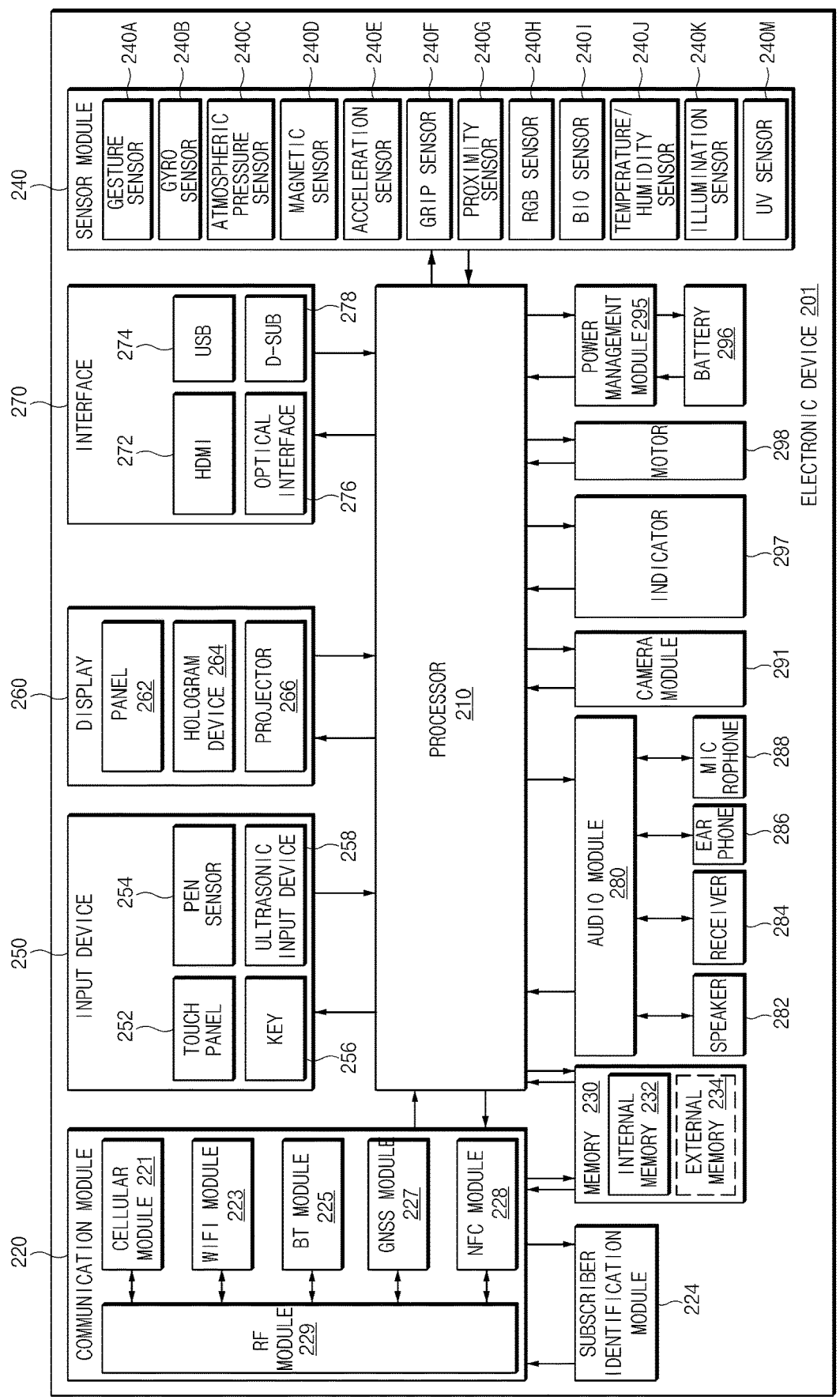
FIG. 2 is a block diagram illustrating an example configuration of an electronic device according to various example embodiments of the present disclosure.

FIG. 2 is a block diagram illustrating an example electronic device, according to various example embodiments of the present disclosure.

Referring to FIG. 2, an electronic device 201 may include all or a part of the electronic device 101 illustrated in FIG. 1. The electronic device 201 may include one or more processors (e.g., an application processor (AP)) (e.g., including processing circuitry) 210, a communication module (e.g., including communication circuitry) 220, a subscriber identification module 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

For example, the processor 210 may include various processing circuitry and be implemented with a System on Chip (SoC). According to an embodiment, the processor 210 may further include a graphic processing unit (GPU) and/or an image signal processor. The processor 210 may include at least a part (e.g., a cellular module 221) of elements illustrated in FIG. 2. The processor 210 may load an instruction or data, which is received from at least one of other elements (e.g., a nonvolatile memory), into a volatile memory and process the loaded instruction or data. The processor 210 may store result data in the nonvolatile memory.

The communication module 220 may be configured the same as or similar to the communication interface 170 of FIG. 1. The communication module 220 may include various communication circuitry, such as, for example, and without limitation, one or more of the cellular module 221, a Wi-Fi module 223, a Bluetooth (BT) module 225, a GNSS module 227, a near field communication (NFC) module 228, and a radio frequency (RF) module 229, or the like. The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 224. According to an embodiment, the cellular module 221 may perform at least a portion of functions that the processor 210 provides.

According to an embodiment, the cellular module 221 may include a communication processor (CP). According to an embodiment, at least a part (e.g., two or more) of the cellular module 221, the Wi-Fi module 223, the BT module 225, the GNSS module 227, or the NFC module 228 may be included within one Integrated Circuit (IC) or an IC package. For example, the RF module 229 may transmit and receive a communication signal (e.g., an RF signal). For example, the RF module 229 may include a transceiver, a power amplifier module (PAM), a frequency filter, a low noise amplifier (LNA), an antenna, or the like. According to another embodiment, at least one of the cellular module 221, the Wi-Fi module 223, the BT module 225, the GNSS module 227, or the NFC module 228 may transmit and receive an RF signal through a separate RF module.

The subscriber identification module 224 may include, for example, a card and/or embedded SIM that includes a subscriber identification module and may include unique identity information (e.g., integrated circuit card identifier (ICCID)) or subscriber information (e.g., international mobile subscriber identity (IMSI)).

The memory 230 (e.g., the memory 130) may include an internal memory 232 and/or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 234 may include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

The sensor module 240 may measure, for example, a physical quantity or may detect an operation state of the electronic device 201. The sensor module 240 may convert the measured or detected information to an electrical signal. For example, the sensor module 240 may include at least one of a gesture sensor 240A, a gyro sensor 240B, a barometric (e.g., atmospheric) pressure sensor 240C, a magnetic sensor 240D, an acceleration sensor 240E, a grip sensor 240F, the proximity sensor 240G, a color sensor 240H (e.g., red, green, blue (RGB) sensor), a biometric (e.g., bio) sensor 240I, a temperature/humidity sensor 240J, an illuminance (e.g., illumination) sensor 240K, and/or an UV sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include various input circuitry, such as, for example, and without limitation, one or more of a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user. The (digital) pen sensor 254 may be, for example, a part of a touch panel or may include an additional sheet for recognition. The key 256 may include, for example, a physical button, an optical key, or a keypad. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, a projector 266, and/or a control circuit for controlling the panel 262, the hologram device 264, or the projector 266. The panel 262 may be implemented, for example, to be flexible, transparent or wearable. The panel 262 and the touch panel 252 may be integrated into a single module. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. The hologram device 264 may display a stereoscopic image in a space using a light interference phenomenon. The projector 266 may project light onto a screen so as to display an image. For example, the screen may be arranged in the inside or the outside of the electronic device 201.

The interface 270 may include various interface circuitry, such as, for example, and without limitation, one or more of a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or generally, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like.

The electronic device 201 may include a processing device (e.g., a GPU) for supporting a mobile TV. The processing device for supporting the mobile TV may process media data according to the standards of digital multimedia broadcasting (DMB), digital video broadcasting (DVB), MediaFLO™, or the like. Each of the above-mentioned elements of the electronic device according to various embodiments of the present disclosure may be configured with one or more components, and the names of the elements may be changed according to the type of the electronic device. In various embodiments, some elements of the electronic device (e.g., the electronic device 201) may be omitted or other additional elements may be added. Furthermore, some of the elements of the electronic device may be combined with each other so as to form one entity, so that the functions of the elements may be performed in the same manner as before the combination.

Figure 3:
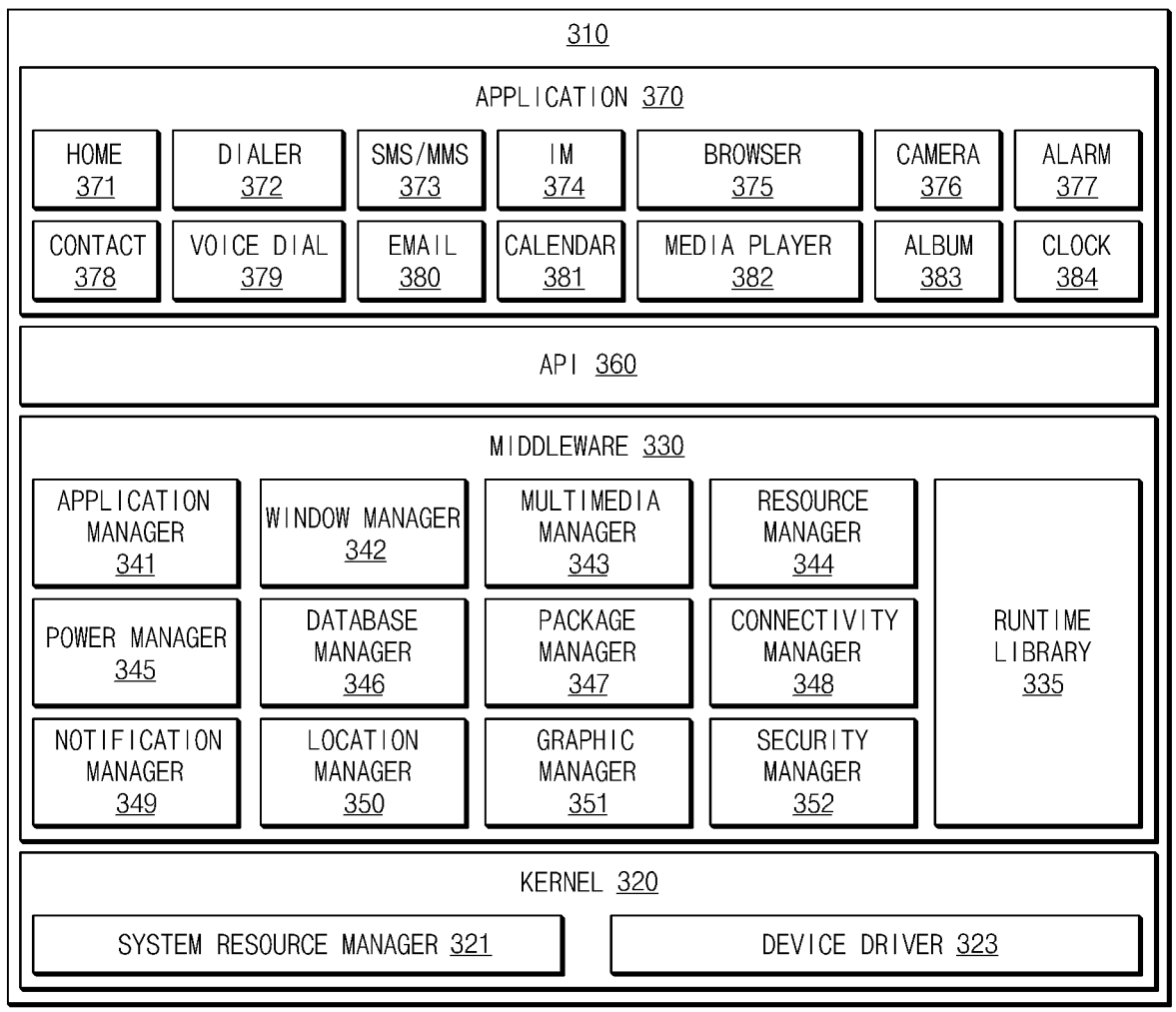
FIG. 3 is a block diagram illustrating an example program module according to various example embodiments of the present disclosure.

FIG. 3 is a block diagram illustrating an example program module, according to various example embodiments of the present disclosure.

Referring to FIG. 3, a program module 310 (e.g., the program 140) may include an operating system (OS) to control resources associated with an electronic device (e.g., the electronic device 101), and/or diverse applications (e.g., the application program 147) driven on the OS. The OS may be, for example, Android™, iOS™, Windows™, Symbian™, Tizen™, or Bada™. The program module 310 may include a kernel 320 (e.g., the kernel 141), a middleware 330 (e.g., the middleware 143), an application programming interface (API) 360 (e.g., the API 145), and/or an application 370 (e.g., the application program 147). At least a portion of the program module 310 may be preloaded on an electronic device or may be downloadable from an external electronic device (e.g., the first electronic device 102, the second electronic device 104, the server 106, or the like).

The kernel 320 (e.g., the kernel 141) may include, for example, a system resource manager 321 and/or a device driver 323. The system resource manager 321 may control, allocate, or retrieve system resources. According to an embodiment, the system resource manager 321 may include a process managing unit, a memory managing unit, a file system managing unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function that the application 370 needs in common, or may provide diverse functions to the application 370 through the API 360 to allow the application 370 to efficiently use limited system resources of the electronic device.

According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352.

The runtime library 335 may include, for example, a library module that is used by a compiler to add a new function through a programming language while the application 370 is being executed. The runtime library 335 may perform input/output management, memory management, or capacities about arithmetic functions. The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a memory space or source code of the application 370. The power manager 345 may manage a battery capacity, temperature, or power, and may determine or provide power information for an operation of an electronic device by using the corresponding information. According to an embodiment, the power manager 345 may operate with a basic input/output system (BIOS). The database manager 346 may generate, search for, or modify database that is to be used in the application 370. The package manager 347 may install or update an application that is distributed in the form of package file.

The connectivity manager 348 may manage, for example, wireless connection. The notification manager 349 may provide an event, for example, arrival message, appointment, or proximity notification to a user. For example, the location manager 350 may manage location information about an electronic device. The graphic manager 351 may manage a graphic effect that is provided to a user, or manage a user interface relevant thereto. The security manager 352 may provide, for example, system security or user authentication.

According to an embodiment, the middleware 330 may include a telephony manager for managing a voice or video call function of the electronic device or a middleware module that combines diverse functions of the above-described elements. According to an embodiment, the middleware 330 may provide a module specialized to each OS kind to provide differentiated functions. Additionally, the middleware 330 may dynamically remove a part of the preexisting elements or may add new elements thereto. The API 360 may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 370 may include, for example, applications such as a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, and/or a watch/clock 384. Additionally, or alternatively, though not illustrated, the application 370 may include various applications, including, for example, and without limitation, health care (e.g., measuring an exercise quantity, blood sugar, or the like) or offering of environment information (e.g., information of barometric pressure, humidity, temperature, or the like). According to an embodiment, the application 370 may include an information exchanging application to support information exchange between an electronic device and an external electronic device. The information exchanging application may include, for example, a notification relay application for transmitting specific information to an external electronic device, or a device management application for managing the external electronic device. For example, the notification relay application may include a function of transmitting notification information, which arise from other applications, to an external electronic device or may receive, for example, notification information from an external electronic device and provide the notification information to a user. The device management application may install, delete, or update for example, a function (e.g., turn-on/turn-off of an external electronic device itself (or a part of components) or adjustment of brightness (or resolution) of a display) of the external electronic device which communicates with the electronic device, and an application running in the external electronic device. According to an embodiment, the application 370 may include an application (e.g., a health care application of a mobile medical device) that is assigned in accordance with an attribute of an external electronic device. According to an embodiment, the application 370 may include an application that is received from an external electronic device. At least a portion of the program module 310 may be implemented by software, firmware, hardware (e.g., the processor 210), or a combination (e.g., execution) of two or more thereof, and may include modules, programs, routines, sets of instructions, processes, or the like for performing one or more functions.

The term "module" used in this disclosure may include, for example a unit including hardware, software, firmware and/or any combinations thereof, and may be interchangeably used with the terms "unit", "logic", "logical block", "component" and "circuit". The "module" may be an integrated component or may be a minimum unit for performing one or more functions or a part thereof. The "module" may be implemented mechanically or electronically and may include, for example, and without limitation, at least one of a dedicated processor, a CPU, an application-specific IC (ASIC) chip, a field-programmable gate array (FPGA), and a programmable-logic device for performing some operations, or the like, which are known or will be developed.

At least a part of an apparatus (e.g., modules or functions thereof) or a method (e.g., operations) according to various embodiments may be, for example, implemented by instructions stored in computer-readable storage media (e.g., the memory 130) in the form of a program module. The instruction, when executed by a processor (e.g., the processor 120), may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and an internal memory. Also, a program instruction may include not only a mechanical code such as things generated by a compiler but also a high-level language code executable on a computer using an interpreter. A module or a program module according to various embodiments may include at least one of the above elements, or a part of the above elements may be omitted, or other elements may be further included. Operations performed by a module, a program module, or other elements according to various embodiments may be executed sequentially, in parallel, repeatedly, or in a heuristic method or some operations may be executed in different sequences or may be omitted. Alternatively, other operations may be added.

Figure 4:
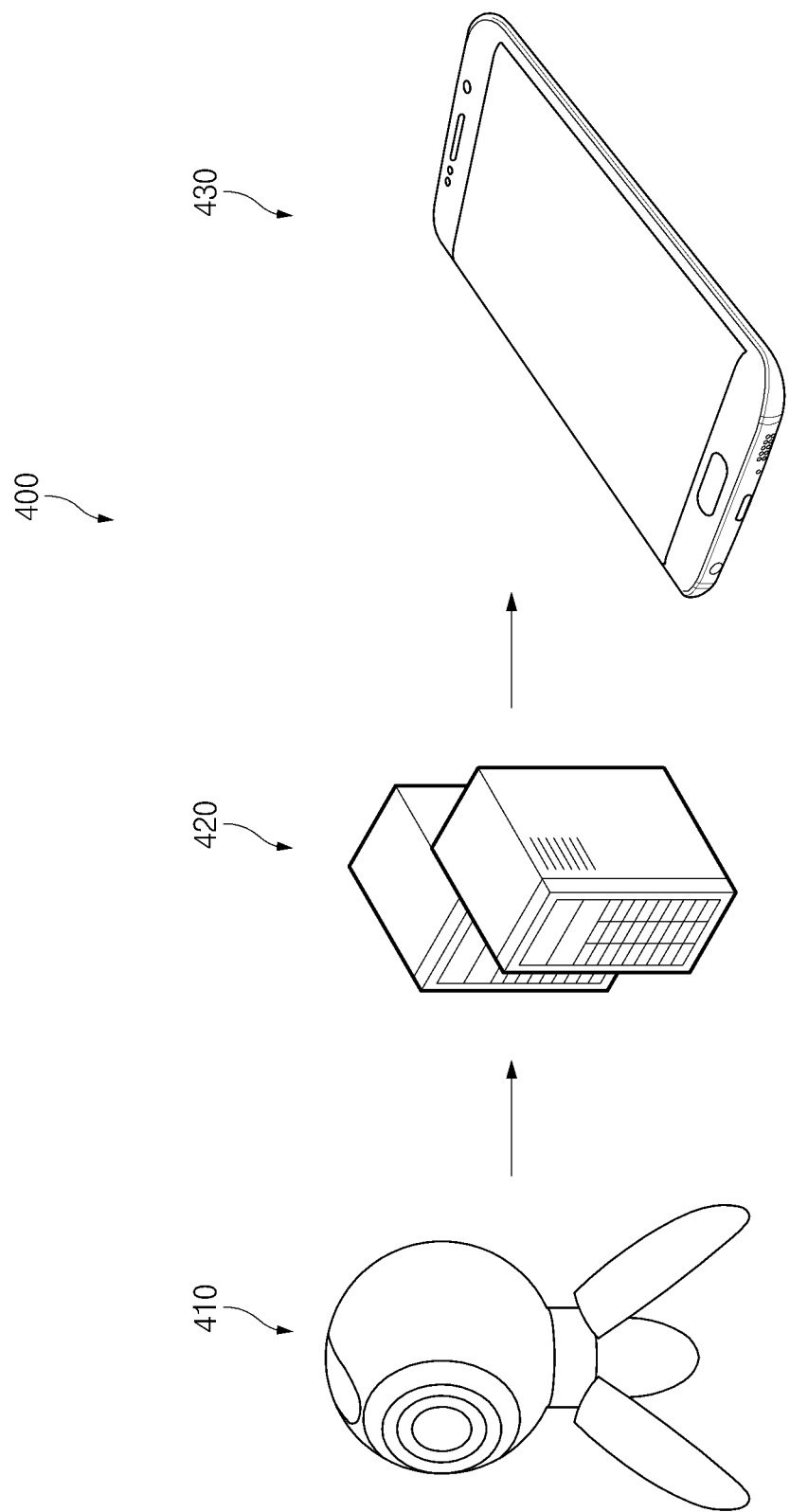
FIG. 4 is a diagram illustrating an example image processing system according to various example embodiments of the present disclosure.

FIG. 4 is a diagram illustrating an example image processing system according to various example embodiments of the present disclosure.

Referring to FIG. 4, an image processing system 400 may include a camera device 410, a first electronic device 420 (e.g., a server 106 of FIG. 1), and a second electronic device 430 (e.g., an electronic device 101 of FIG. 1 or an electronic device 201 of FIG. 2). The image processing system 400 may transmit and receive an image (or a video image) captured omnidirectionally and may provide the image to a user.

The camera device 410 may include various image capturing circuitry and omnidirectionally capture an image (or image data). For example, the camera device 410 may include a plurality of lenses (or a plurality of camera modules). The camera device 410 may divide an omnidirection at a specified angle through the plurality of lens and may capture an image. The lens may be a fish eye lens capable of having an angle of view of a specified angle (e.g., 180 degrees) or more. An image captured through the fish eye lens may be a fish eye image. For another example, the camera device 410 may include one or more lens (or one or more camera modules, for example, a camera module capable of simultaneously capturing a front surface and a rear surface). The camera device 410 may move automatically or manually to capture an image omnidirectionally. Thus, the camera device 410 may generate an omnidirectional image.

The first electronic device 420 may, for example, and without limitation, include a server which transmits a stored image. For example, the first electronic device 420 may process and store an omnidirectional image received from the camera device 410 and may transmit the stored image to the second electronic device 430.

According to an embodiment, the first electronic device 420 may map the omnidirectional image to a 2D plane. For example, the first electronic device 420 may map the omnidirectional image to the 2D plane using an equirectangular projection (ERP) scheme. Further, the first electronic device 420 may map the image (or an ERP image) mapped to the 2D plane using the ERP scheme to the 2D plane again using a polyhedron projection (PHP) scheme. The first electronic device 420 may map, for example, an ERP image to a polyhedron and may arrange a plurality of surface of the polyhedron to which the ERP image is mapped, on the 2D plane.

According to an embodiment, the first electronic device 420 may transmit an image (or a PHP image) generated based on the polyhedron to the second electronic device 430. For example, the first electronic device 420 may transmit the PHP image to the second electronic device 430. According to an embodiment, the first electronic device 420 may transmit metadata together with the PHP image to the second electronic device 430. The metadata may include information for mapping the PHP image to a 3D space.

According to an embodiment, the first electronic device 420 may transmit an image selected based on a state of the second electronic device 430 to the second electronic device 430. For example, the first electronic device 420 may transmit a PHP image corresponding to a request received from the second electronic device 430 to the second electronic device 430. The second electronic device 430 may select, for example, information indicating an image generated based on a polyhedron based on a state of the second electronic device 430 (e.g., a state where the second electronic device 430 processes an image or a state where the second electronic device 430 is connected to a network) and may transmit a request corresponding to the selected information to the first electronic device 420. The first electronic device 420 may transmit a PHP image corresponding to the request to the second electronic device 420. As another example, the first electronic device 420 may directly verify a state where the first electronic device 420 is connected with the second electronic device 430 over a network and may transmit a PHP image to the second electronic device 430 depending on the verified state. The electronic device 420 may verify, for example, state information of a channel established for communication with the second electronic device 430.

According to another embodiment, the camera device 410 and the first electronic device 420 may be implemented as one electronic device. For example, the first electronic device 420 may include a camera module and may generate an ERP image and a PHP image by generating an omnidirectional image through the camera module and processing the generated omnidirectional image.

The second electronic device 430 may render an image received from the first electronic device 420. For example, the second electronic device 430 may receive a PHP image from the first electronic device 420 and may map the PHP image to a 3D space to render the PHP image. The PHP image may be mapped to, for example, a polyhedron generated based on the PHP image. According to an embodiment, the second electronic device 430 may play back the received image. For example, the second electronic device 430 may render the received image and may play back the rendered image. The second electronic device 430 may display, for example, the rendered image (or a 3D image) on its display. According to an embodiment, the second electronic device 430 may include an electronic device, such as a virtual reality (VR) device (e.g., a head mounted display (HMD)), a mobile phone, a personal computer (PC), a television (TV), or a tablet PC, or the like, but is not limited thereto, which may process an image.

According to an embodiment, the second electronic device 430 may verify its state information and may select an image to be received, based on the state information. For example, the second electronic device 430 may select information indicating an image generated based on a polyhedron, depending on the verified state information. The information indicating the image generated based on the polyhedron may be, for example, information indicating an image generated using a rendering scheme based on the selected polyhedron. The second electronic device 430 may select the PHP image to be received, by transmitting a request corresponding to the selected information to the first electronic device 420.

According to another embodiment, the camera device 410 may capture an omnidirectional image (e.g., a fish eye image) and may transmit an image to the second electronic device 430. The image transmitted to the second electronic device 430 may be, for example, an omnidirectional image. According to an embodiment, the second electronic device 430 may generate an ERP image by mapping the omnidirectional image to a 2D plane. The second electronic device 430 may transmit the generated ERP image to the first electronic device 420. According to an embodiment, the first electronic device 420 may generate a PHP image by mapping the ERP image to a 2D plane. The first electronic device 420 may transmit the PHP image to the second electronic device 430. According to an embodiment, the second electronic device 430 may render a PHP image using a rendering scheme corresponding to the received PHP image and may display the rendered image on its display.

The first electronic device 420 of the image processing system 400 may transmit an image generated in consideration of state information of the second electronic device 430 to the second electronic device 430 such that streaming of an omnidirectional image is smoothly performed.

A description will be given of operations of the first electronic device 420 (e.g., the server 106 of FIG. 1) which provides an image and the second electronic device 430 (e.g., the electronic device 101 of FIG. 1 or the electronic device 201 of FIG. 2) which provides a request for the image in greater detail below with reference to FIGS. 5 to 13.

Figure 5:
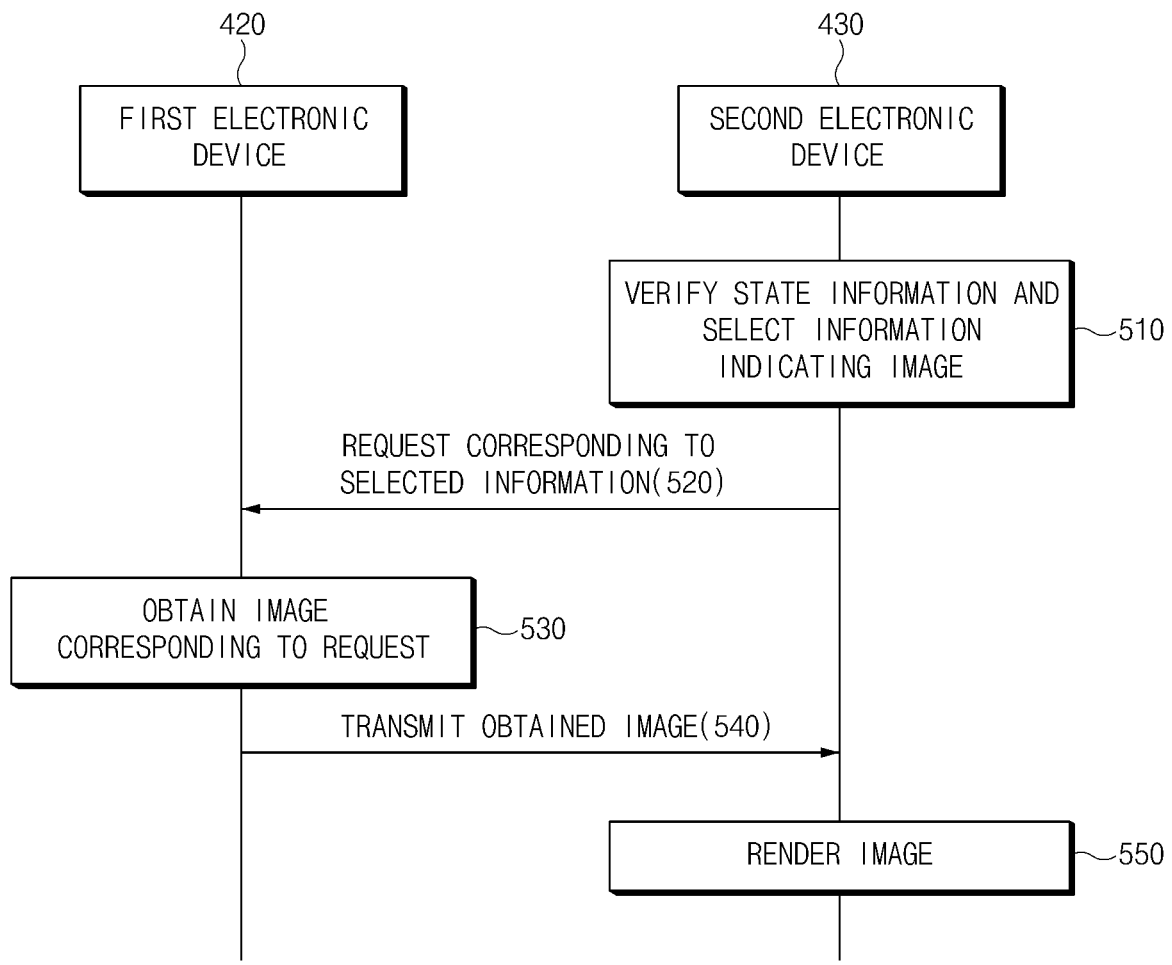
FIG. 5 is a sequence diagram illustrating an example method for processing an image of an image processing system according to various example embodiments of the present disclosure.

FIG. 5 is a sequence diagram illustrating an example method for processing an image of an image processing system according to various example embodiments of the present disclosure.

According to an embodiment, in operation 510, a second electronic device 430 may verify its state information and may select information indicating an image generated based on a polyhedron depending on the verified state information. For example, the second electronic device 430 may select a type of a polyhedron to which an omnidirectional image will be mapped, based on the verified state information to select information indicating an image generated based on the polyhedron.

According to an embodiment, in operation 520, the second electronic device 430 may transmit a request corresponding to the selected information to a first electronic device 420. The request may include, for example, information about a PHP image included in the selected information.

According to an embodiment, in operation 530, the first electronic device 420 may receive the request and may obtain an image corresponding to the received request. For example, the first electronic device 420 may generate the image corresponding to the received request. The first electronic device 420 may generate, for example, a PHP image corresponding to the received request. For another example, the first electronic device 420 may generate images in a plurality of manners in advance and may store the images in its memory, thus selecting an image corresponding to the request when receiving the request. The first electronic device 420 may select, for example, a PHP image corresponding to the received request among the images stored in the memory. According to an embodiment, the first electronic device 420 may obtain metadata corresponding to the obtained image. The first electronic device 420 may obtain metadata for the obtained PHP image together with the PHP image.

According to an embodiment, in operation 540, the first electronic device 420 may transmit the obtained image to the second electronic device 430. The first electronic device 420 may transmit metadata corresponding to the obtained image together with the obtained image to the second electronic device 430.

According to an embodiment, in operation 550, the second electronic device 430 may receive the image from the first electronic device 420 and may render the received image. The second electronic device 430 may receive the metadata from the first electronic device 420 and may render the received image on a 3D space using the received metadata. For example, the second electronic device 430 may map the PHP image to the polyhedron to render the PHP image.

Figure 6:
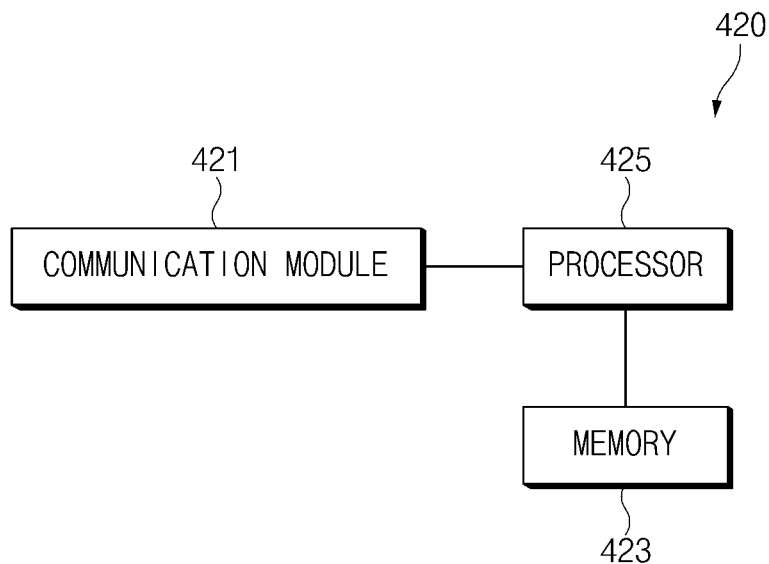
FIG. 6 is a block diagram illustrating an example configuration of a first electronic device according to an example embodiment of the present disclosure.

FIG. 6 is a block diagram illustrating an example configuration of a first electronic device according to an example embodiment of the present disclosure.

Referring to FIG. 6, a first electronic device 420 may include a communication module (e.g., including communication circuitry) 421, a memory 423, and a processor (e.g., including processing circuitry) 425.

The communication module 421 (or a communication circuit) may be connected with a second electronic device 430 of FIG. 4 and may include various communication circuitry to transmit and receive data with the second electronic device 430. For example, the communication module 421 may receive a request corresponding to a selected image from the second electronic device 430. For another example, the communication module 421 may transmit an image corresponding to the request and metadata corresponding to the image to the second electronic device 430.

The memory 423 may store an omnidirectional image. For example, the memory 423 may store an omnidirectional image captured by the first electronic device 420 or an omnidirectional image received from an external electronic device.

According to an embodiment, the memory 423 may store a 2D image obtained by mapping an omnidirectional image to a 2D plane. For example, the memory 423 may store an ERP image in which an omnidirectional image is located on a 2D plane. For another example, the memory 423 may store a PHP image generated by arranging the ERP image on a polyhedron.

The processor 425 may include various processing circuitry and control an overall operation of the first electronic device 420. For example, the processor 425 may control the communication module 421 or the memory 423 and may process an omnidirectional image to generate a 2D image.

According to an embodiment, the processor 425 may map an omnidirectional image to a 2D plane to generate a 2D image. For example, the processor 425 may map an omnidirectional image to the 2D plane in an ERP scheme to generate an ERP image. For another example, the processor

425 may map the ERP image to a polyhedron in a PHP scheme to generate a PHP image.

According to an embodiment, the processor 425 may receive a request corresponding to an image generated based on the polyhedron from the second electronic device 430 and may obtain an image. For example, if a request for receiving a PHP image is received, the processor 425 may generate the PHP image corresponding to the request. For another example, if a request for receiving a PHP image is received, the processor 425 may select the PHP image corresponding to the received request among images stored in the memory 423. According to an embodiment, the processor 425 may obtain metadata corresponding to the generated PHP image. The metadata may include information for mapping the PHP image to a 3D space. For example, the metadata may include information (or type information) about a polyhedron to which an omnidirectional image is mapped and information about a state where a plurality of surfaces of the polyhedron are located. The information about the state where the plurality of surfaces of the polyhedron are located may include information (or subtype information) about a plane on which the plurality of surfaces are located and information (or geometry information) about a location where each of the plurality of surfaces is located on the plane. According to an embodiment, the processor 425 may transmit the PHP image and the metadata to the second electronic device 430.

According to an embodiment, the first electronic device 420 may include the at least one processor 425. For example, the electronic device 420 may include the plurality of processors 425 which may perform at least one function. The processor 425 may be implemented as, for example, a system on chip (SoC) including, for example, and without limitation, a central processing unit (CPU), a graphic processing unit (GPU), a memory, or the like. According to an embodiment, the first electronic device 420 may include at least one element which may perform the described function. For example, the first electronic device 420 may include a transcoder for arranging an omnidirectional image on a polyhedron and an encoder for encoding an image.

According to an embodiment, if the first electronic device 420 is an image capture device, it may further include a camera module for capturing an omnidirectional image. For example, the first electronic device 420 may include one or more lenses (or camera modules) for capturing an omnidirectional image.

A description will be given of a process of generating an ERP image and a PHP image at the first electronic device 420 in greater detail below with reference to FIGS. 7A to 9D.

Figure 7A:
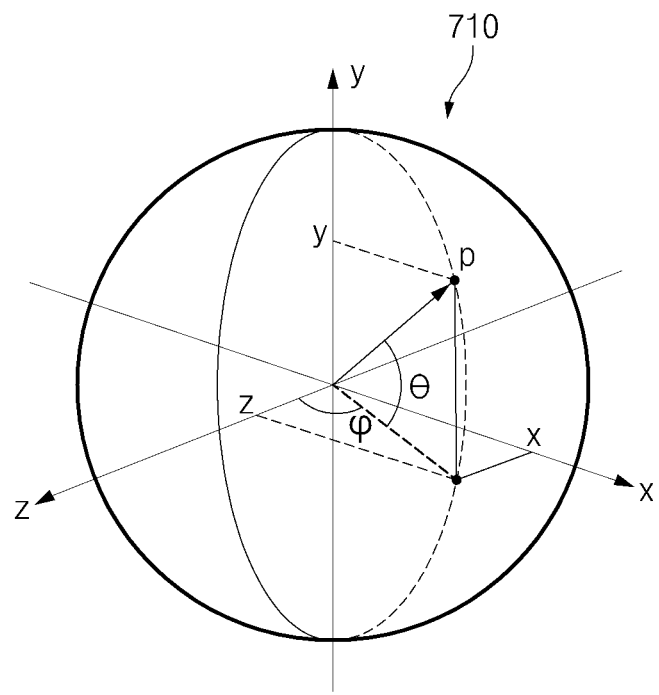
FIGS. 7A, 7B, and 7C are diagrams illustrating an example method for generating an equirectangular projection (ERP) image by mapping an omnidirectional image to a two-dimensional (2D) plane at a first electronic device according to an example embodiment of the present disclosure.
Figure 7B:
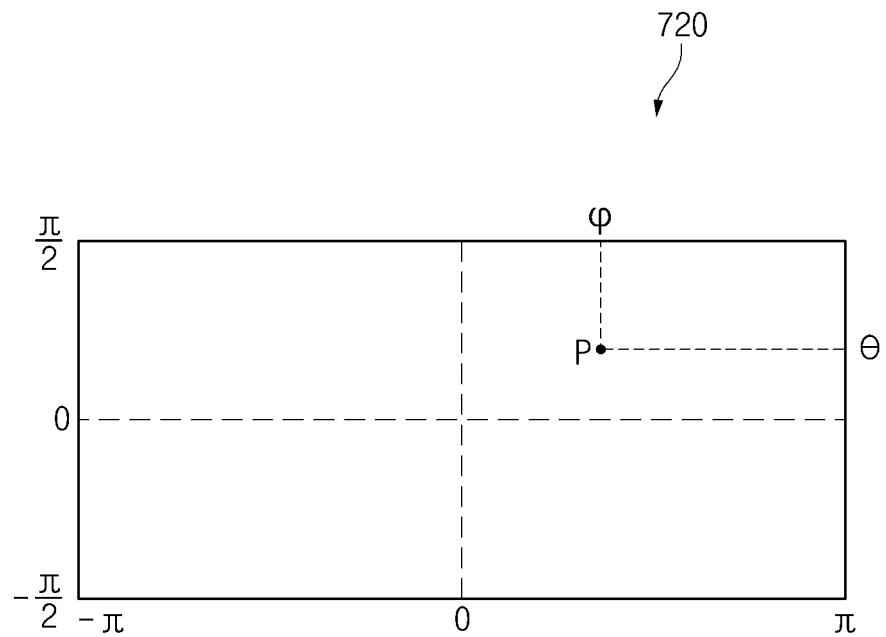
Figure 7C:
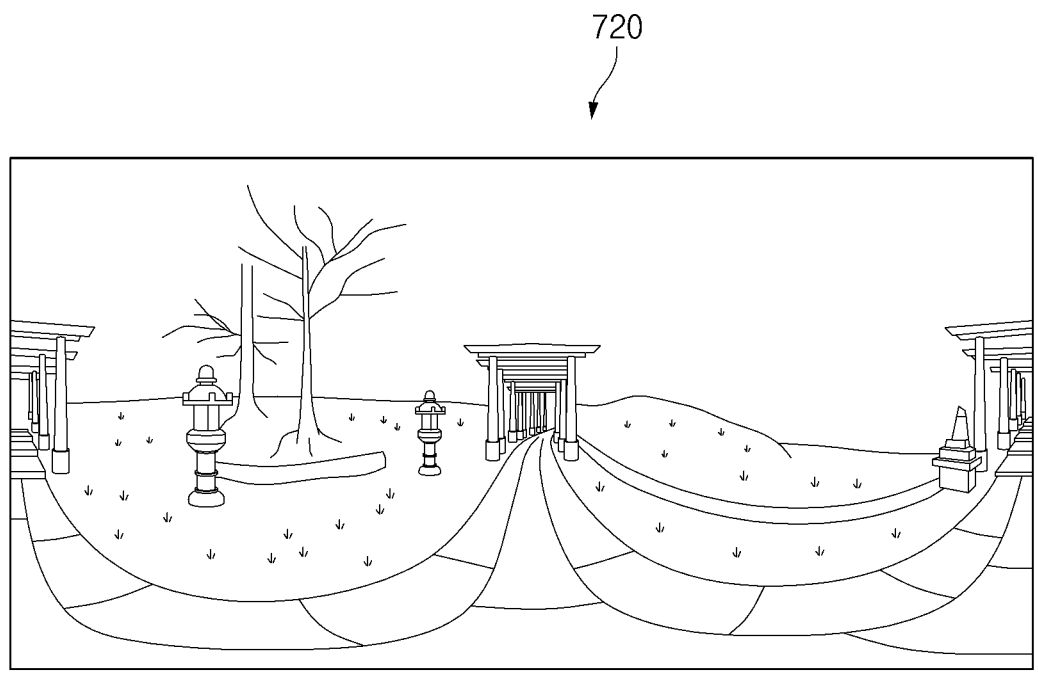

FIGS. 7A, 7B and 7C are diagrams illustrating an example method for generating an ERP image by mapping an omnidirectional image to a 2D plane at a first electronic device according to an example embodiment of the present disclosure.

Referring to FIGS. 7A to 7C, a first electronic device 420 of FIG. 4 may map an omnidirectional image 710 to the 2D plane to generate an ERP image 720. The first electronic device 420 may map the omnidirectional image 710 to the 2D plane using an ERP scheme. The ERP scheme may be a cylindrical equidistant projection for converting Cartesian coordinates into spherical coordinates.

Referring to FIG. 7A, the first electronic device 420 may represent the omnidirectional image 710 on a 3D spherical surface. The first electronic device 420 may convert Cartesian coordinates (x, y, z) of any pixel P of the omnidirectional image 710 into spherical coordinates (x, y, z) using Equations 1 to 3 below.

$$r = \sqrt{x^2 + y^2 + z^2} \quad \text{[Equation 1]}$$

$$\varphi = \cos^{-1}\left(\frac{z}{r}\right) \quad \text{[Equation 2]}$$

$$\theta = \tan^{-1}\left(\frac{y}{x}\right) \quad \text{[Equation 3]}$$

Referring to FIG. 7B, the first electronic device 420 may map the omnidirectional image 710 to the 2D plane using a range ($r \geq 0$, $-\pi/2 \leq \theta \leq \pi/2$, $-\pi \leq \varphi \leq \pi$) of r, φ, and θ of the Cartesian coordinates. The any pixel P of the omnidirectional image 710 may be converted into P(φ, θ) of the ERP image 720. The any pixel P of the omnidirectional image 710 may be converted into a plurality of pixels of the ERP image 720. As any pixels of the omnidirectional image 710 are closer to both poles (e.g., the North Pole and the South Pole), the number of corresponding pixels of the ERP image 720 may be more increased. Thus, if the first electronic device 420 maps the omnidirectional image 710 to the 2D plane to generate the ERP image 720, as the any pixels are closer to the both poles, the EPR image 720 may further include redundant information.

Referring to FIG. 7C, large distortion may occur in the ERP image 720 generated by the first electronic device 420. For example, larger distortion may occur in an upper portion and a lower portion corresponding to the both poles of a sphere in the ERP image 720. Thus, the first electronic device 420 may map the ERP image 720 to a polyhedron to generate a PHP image.

Figure 8A:
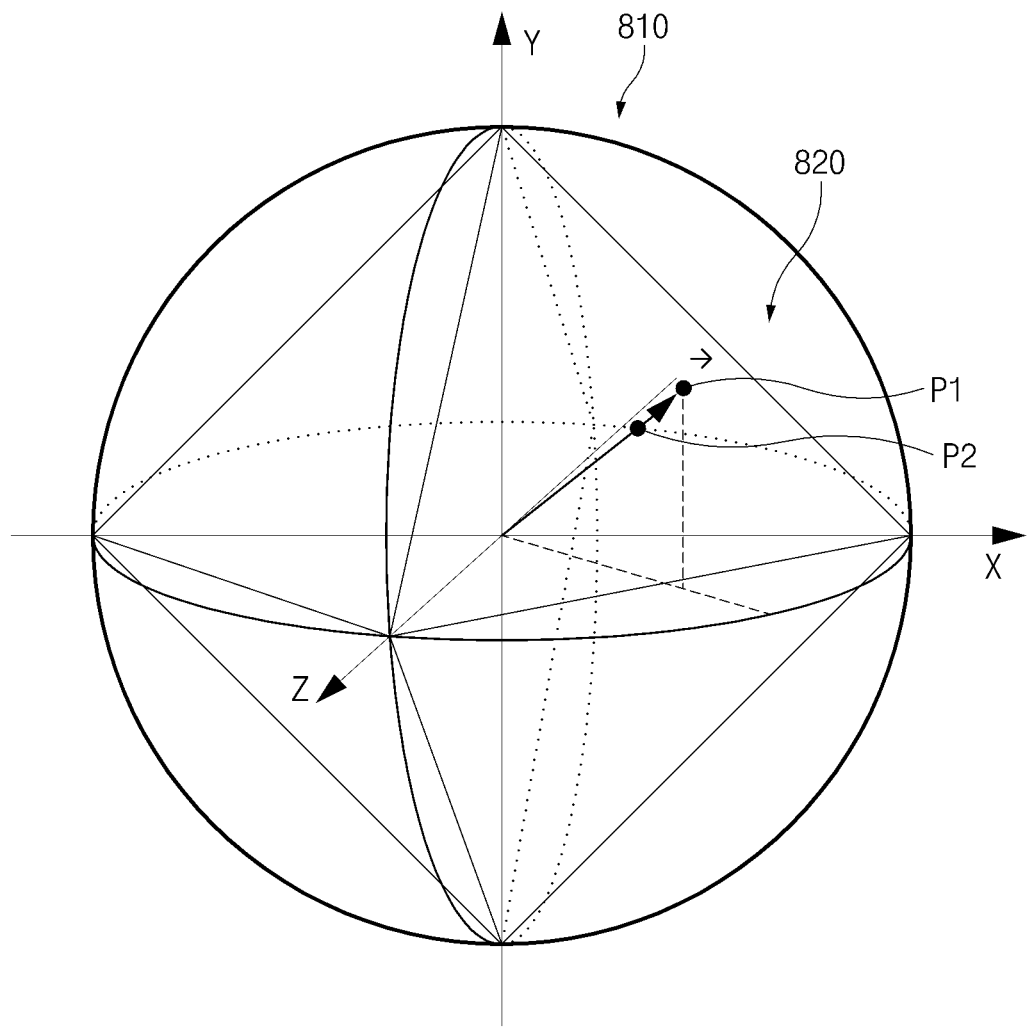
FIGS. 8A, 8B and 8C are diagrams illustrating an example method for mapping an ERP image to a polyhedron at a first electronic device according to an embodiment of the present disclosure.
Figure 8B:
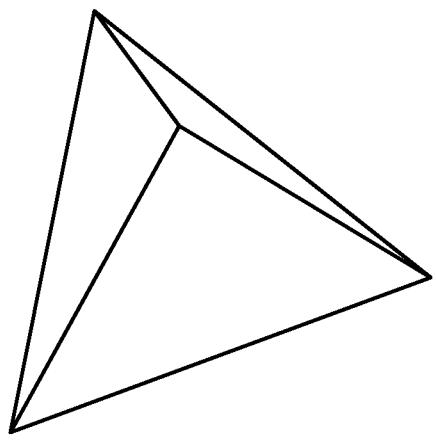
Figure 8B:
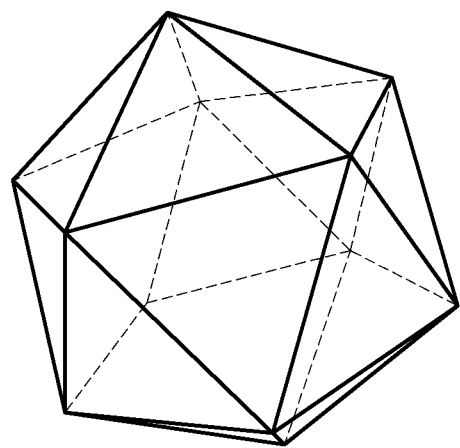
Figure 8C:
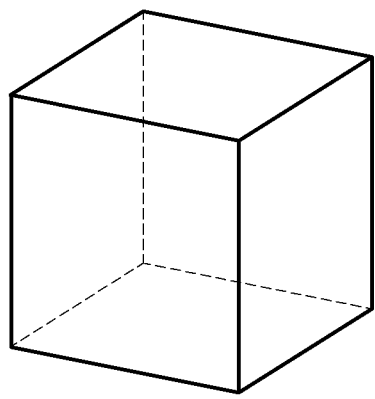
Figure 8C:
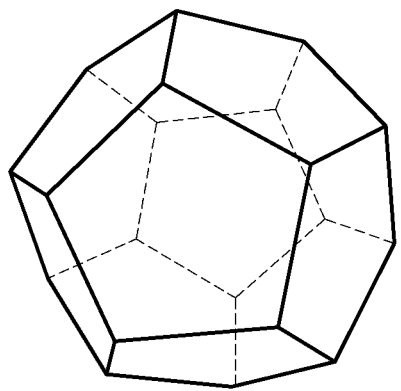

FIGS. 8A, 8B and 8C are diagrams illustrating an example method for mapping an ERP image to a polyhedron at a first electronic device according to an example embodiment of the present disclosure.

Referring to FIG. 8A, a first electronic device 420 of FIG. 4 may map an omnidirectional image to a polyhedron.

According to an embodiment, the first electronic device 420 may map an image to coordinates of a spherical surface 810. For example, the first electronic device 420 may map an ERP image to coordinates of the spherical surface 810. The first electronic device 420 may inversely apply a method for mapping an omnidirectional image to a 2D plane to map the ERP image to spherical coordinates.

According to an embodiment, the first electronic device 420 may map the image mapped to the spherical coordinates to the polyhedron. The first electronic device 420 may map a first pixel P1 to a second pixel P2 of a polyhedron 820 using a vector P from the center of the spherical surface 810 to the first pixel P1 which exists on the spherical surface 810. The second pixel P2 may exist on the vector P to the first pixel P1 and may be an intersection point between the vector P to the first pixel P1 and a surface of the polyhedron. For example, the first electronic device 420 may map the ERP image mapped to the spherical coordinates to a surface of the octahedron 820 using the mapping method.

According to an embodiment, if the first electronic device 420 maps an image mapped to spherical coordinates to a polyhedron which exists in the spherical surface 810, a plurality of pixels of the spherical surface 810 may be mapped to the same pixels of the polyhedron. For example, some of the pixels of the spherical surface 810 may be omitted when mapped to the polyhedron. Thus, if mapping an image mapped to spherical coordinates to the polyhedron, the first electronic device 420 may reduce a size of data.

Referring to FIGS. 8BA to 8C, the first electronic device 420 may map an image to a plurality of polyhedrons (e.g., a platonic solid). For example, the first electronic device 420 may map an image to a polyhedron configured with triangles (e.g., a tetrahedron illustrated in (a) of FIG. 8B or an icosahedron illustrated in (b) FIG. 8B). As another example, the first electronic device 420 may map an image to a polyhedron configured with other figures (e.g., quadrangles or pentagons) (e.g., a hexahedron illustrated in (c) of FIG. 8C or a decahedron illustrated in (d) of FIG. 8C).

According to an embodiment, as the first electronic device 420 maps an image to a polyhedron, the number of surfaces of which is small, among the plurality of polyhedrons, the number of omitted pixels may increase. For example, if the first electronic device 420 maps an image to the tetrahedron illustrated in (a) of FIG. 8B, the number of pixels omitted among pixels of the spherical surface 810 may be relatively large. On the other hand, if the first electronic device 420 maps an image to the icosahedron illustrated in (b) of FIG. 8B, the number of pixels omitted among the pixels of the spherical surface 810 may be relatively small. Thus, the first electronic device 420 may change a polyhedron to which an image is mapped to change capacity of a generated PHP image.

FIGS. 9A, 9B, 9C and 9D are diagrams illustrating an example in which a first electronic device arranges an image mapped to a polyhedron on a 2D plane, according to an example embodiment of the present disclosure.

Figure 9A:
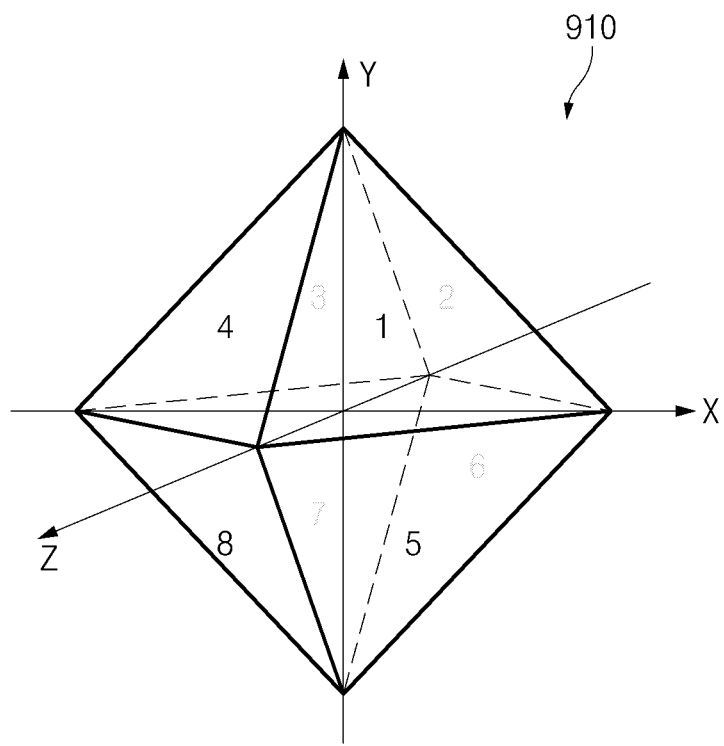
FIGS. 9A, 9B, 9C, and 9D are diagrams illustrating an example in which a first electronic device arranges an image mapped to a polyhedron on a 2D plane, according to an example embodiment of the present disclosure.

Referring to FIG. 9A, a first electronic device 420 of FIG. 4 may arrange a plurality of surfaces of a polyhedron to which an image is mapped, on a 2D plane. For example, the first electronic device 420 may arrange a plurality of surfaces of an octahedron 910 to which a 2D image is mapped, on the 2D plane. The octahedron 910 may include first to eighth surfaces to which the image is mapped. The first to eighth surfaces may be classified into, for example, an upper half surface (e.g., the first to fourth surfaces) and a lower half surface (e.g., the fifth to eighth surfaces) about the X-Y plane. The first electronic device 420 may arrange the first to eighth surfaces on the 2D plane in various methods. Thus, the first electronic device 420 may generate various types of PHP images (or an octahedron projection (OHP) image).

Figure 9B:
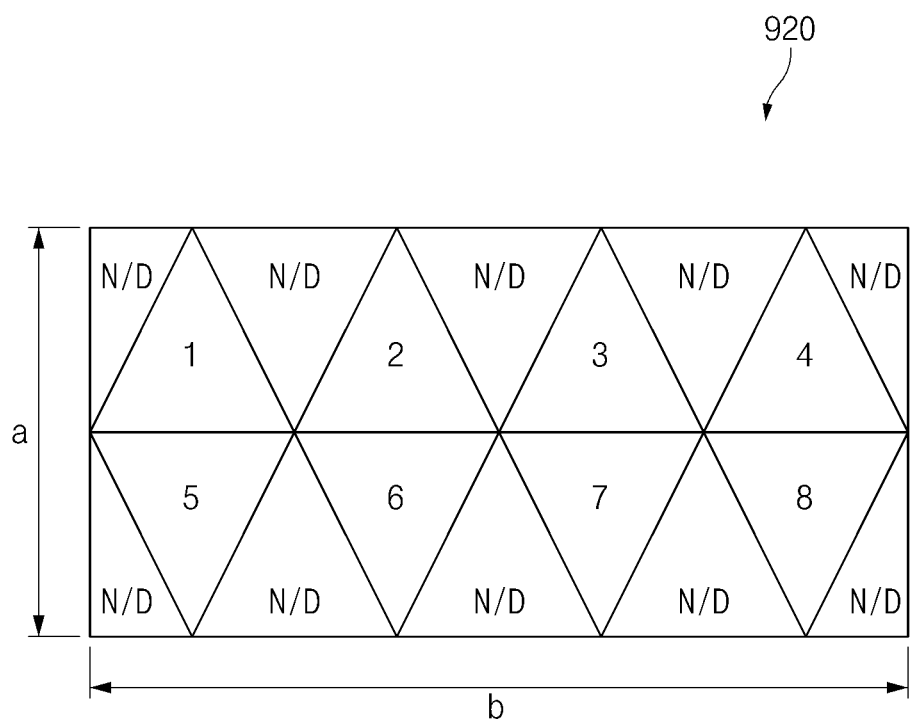

Referring to FIG. 9B, the first electronic device 420 may arrange the upper half surface of the octahedron 910 from the left and to the right at an upper side of a PHP image and may arrange the lower half surface of the octahedron 910 from the left and to the right at a lower side of the PHP image. The first electronic device 420 may arrange one side of each of the first to fourth surfaces to be in contact with one side of each of the fifth to eighth surfaces. Thus, the first electronic device 420 may include 8 equilateral triangles or 4 diamonds and may generate a PHP image 920, a vertical length and a horizontal length of which are a and b.

According to an embodiment, the PHP image 920 generated by the first electronic device 420 may include a no data region N/D where a surface of the octahedron 910 is not located. The no data region N/D may fail to include image information. For example, the PHP image 920 generated by the first electronic device 420 may include less image information than an ERP image. Thus, if encoding the PHP image 920, the first electronic device 420 may obtain higher compression efficiency than the ERP image.

According to another embodiment, the first electronic device 420 may arrange a plurality of surfaces of the octahedron 910 to minimize and/or reduce a region where an image is not located. For example, the first electronic device 420 may reduce capacity of a PHP image by reducing the no data region N/D. If an image is not located in the no data region N/D, the no data region N/D may include any pixel value (e.g., a pixel value of a black color or a chroma key color). Thus, as the no data region N/D is minimized, a generated PHP image may decrease in capacity.

Figure 9C:
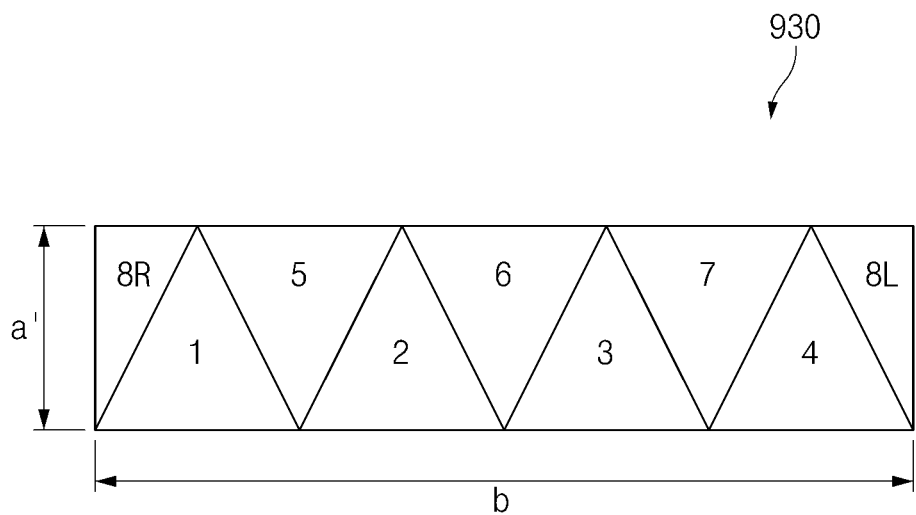

Referring to FIG. 9C, the first electronic device 420 may alternately arrange the upper half surface and the lower half surface of the octahedron 910. The first electronic device 420 may divide the eighth surface of the octahedron 910 into an $8R^{th}$ surface and an $8L^{th}$ surface and may arrange the $8R^{th}$ surface and the $8L^{th}$ surface on a 2D plane. Thus, a PHP image 930 generated by the first electronic device 420 may fail to include a no data region and may be the same as the PHP image 920 of FIG. 9B in the horizontal length b, but may decrease to a vertical length a', for example, ½ of the vertical length a.

Figure 9D:
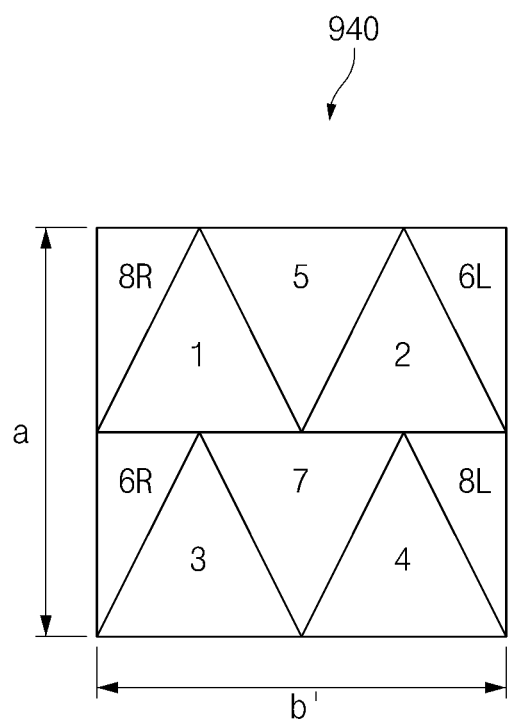

Referring to FIG. 9D, the first electronic device 420 may arrange the upper half surfaces of the octahedron 910 at upper and lower sides of a PHP image and may arrange the lower half surfaces of the octahedron 910 to alternate with the upper half surfaces. The first electronic device 420 may divide the sixth surface of the octahedron 910 into a $6R^{th}$ surface and a $6L^{th}$ surface and may divide the eighth surface of the octahedron into an $8R^{th}$ surface and an $8L^{th}$ surface, thus arranging the $6R^{th}$ surface, the $6L^{th}$ surface, the $8R^{th}$ surface, and the $8L^{th}$ surface on the 2D plane. Thus, a PHP image 940 generated by the first electronic device 420 may fail to include a no data region and may be the same in the vertical length a as the PHP image 920 of FIG. 9B, but may decrease to a horizontal length b', for example, ½ of the horizontal length b.

The first electronic device 420 may arrange the plurality of surfaces of the polyhedron on the 2D plane using various arrangement methods of reducing a no data region, without limiting the above-mentioned arrangement method.

According to an embodiment, a PHP image generated in the various arrangement methods by the first electronic device 420 may include a plurality of image regions. The plurality of image regions may correspond to, for example, a plurality of surfaces of a polyhedron to which an image is mapped, respectively. Thus, the PHP image may include a plurality of image region corresponding to the plurality of surfaces of the polyhedron arranged according to a specified scheme.

Figure 10:
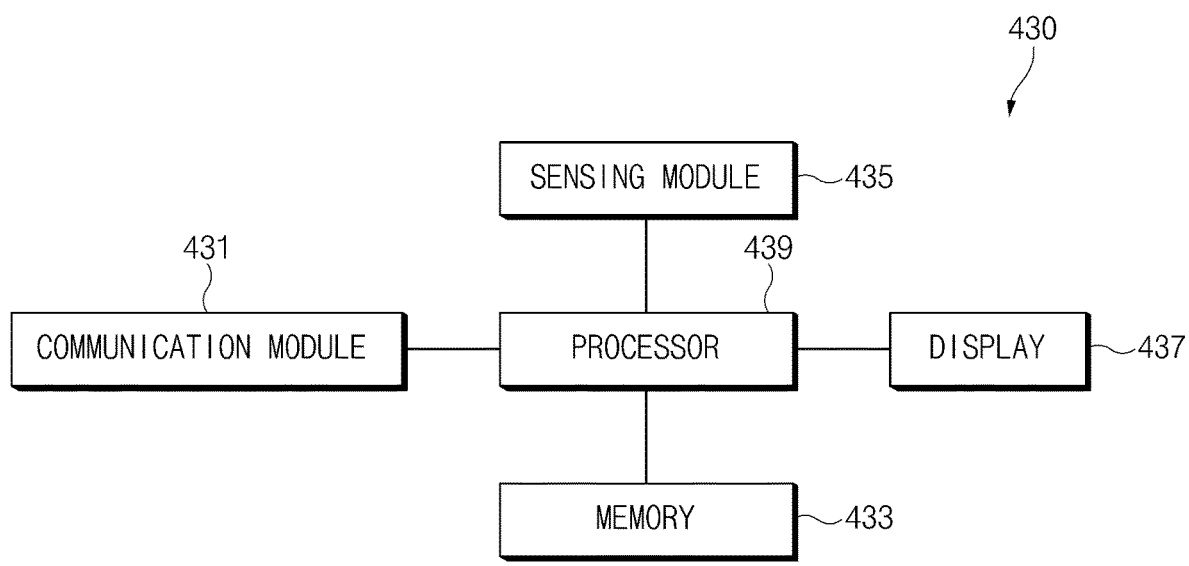
FIG. 10 is a block diagram illustrating an example configuration of a second electronic device according to an example embodiment of the present disclosure.

FIG. 10 is a block diagram illustrating an example configuration of a second electronic device according to an example embodiment of the present disclosure.

Referring to FIG. 10, a second electronic device 430 (e.g., an electronic device 101 of FIG. 1 or an electronic device 201 of FIG. 2) may include a communication module (e.g., including communication circuitry) 431 (e.g., a communication interface 170 of FIG. 1 or a communication module 220 of FIG. 2), a memory 433 (e.g., a memory 130 of FIG. 1 or a memory 230 of FIG. 2), a sensing module (e.g., including sensing circuitry and/or sensors) 435 (e.g., a sensor module 240 of FIG. 2), a display 437 (e.g., a display 160 of FIG. 1 or a display module 260 of FIG. 2), and a processor (e.g., including processing circuitry) 439 (e.g., a processor 120 of FIG. 1 or a processor 210 of FIG. 2).

The communication module 431 may include various communication circuitry and be connected with a first electronic device 420 of FIG. 4 and may transmit and receive data with the first electronic device 420. For example, the communication module 431 may transmit a request corresponding to a selected image to the first electronic device 420. For another example, the communication module 431 may receive an image corresponding to the request and metadata corresponding to the image from the first electronic device 420. For another example, the communication module 431 may transmit information about a field of view (FOV) to the first electronic device 420.

The memory 433 may store an image received from the first electronic device 420. For example, the memory 433 may store a PHP image generated by arranging an ERP image in which an omnidirectional image is mapped to a 2D plane on a polyhedron.

According to an embodiment, the memory 433 may store information indicating an image generated using a rendering scheme based on a polyhedron. The memory 433 may store a plurality of information indicating an image generated using a rendering scheme based on each of a plurality of polyhedrons (e.g., a tetrahedron, a hexahedron, an octahedron, a decahedron, or an icosahedron). For example, the memory 433 may store first information indicating a first image (or image data) generated using a first rendering scheme based on a first polyhedron configured with a first number of surfaces and second information indicating a second image generated using a second rendering scheme based on a second polyhedron configured with a second number of surfaces. The first number of surfaces may differ from the second number of surfaces. The plurality of information may include, for example, information about a polyhedron (e.g., the number of surfaces of the polyhedron) to which an omnidirectional image may be mapped.

The sensing module 435 may include various sensing circuitry/sensors and sense a line of sight of a user. For example, the sensing module 435 may include an infrared (IR) sensor. The IR sensor may sense an iris and pupil of the user to sense a line of sight of the user. For another example, the sensing module 435 may include a motion sensor. The motion sensor may sense motion of a head of the user to sense a line of sight of the user.

The display 437 may display a rendered image. For example, the display 437 may display an image corresponding to an FOV determined by the processor 435 in the rendered image.

The processor 439 may include various processing circuitry and control an overall operation of the second electronic device 430. For example, the processor 439 may control the communication module 431, the memory 433, or the sensing module 435 to generate an omnidirectional image and may display the generated image on the display 437.

According to an embodiment, the processor 439 may verify state information of the second electronic device 430. For example, the processor 439 may verify state information of a resource which processes the image. The processor 439 may verify a data throughput of a CPU (or a GPU) (e.g., an amount of data capable of being processed by the CPU or an amount of data currently processed by the CPU), a decoding capability of the CPU, or a rendering capability of the CPU. For another example, the processor 439 may verify information about a state where the second electronic device 430 is connected to a network through the communication module 431. The processor 439 may verify, for example, state information of a channel established for communication with the first electronic device 420.

According to an embodiment, the processor 439 may select information indicating an image generated based on a polyhedron, based on the state information. For example, the processor 439 may select a type of a polyhedron to which an omnidirectional image will be mapped, based on the state information to select information indicating an image generated based on the polyhedron. The information indicating the image generated based on the polyhedron may be, for example, information indicating an image generated using a rendering scheme based on the selected polyhedron. According to an embodiment, the processor 439 may transmit a request corresponding to the selected information to the first electronic device 420. The request may include, for example, information about a polyhedron corresponding to the selected information.

According to an embodiment, the processor 439 may receive an image corresponding to the request from the first electronic device 420. For example, the processor 439 may receive a PHP image in which an omnidirectional image is mapped to a polyhedron corresponding to the request. According to an embodiment, the processor 439 may receive metadata corresponding to the received PHP image. The metadata may include, for example, information necessary for arranging the PHP image on a 3D space.

According to an embodiment, the processor 439 may render the received image on a 3D space. For example, the processor 439 may map the received image to a polyhedron to render the received image. The processor 439 may verify, for example, a polyhedron to which an omnidirectional image is mapped and a state where a plurality of surfaces of the polyhedron are located, using the metadata. The processor 439 may designate (or divide) the received image as (or into) a plurality of regions based on the state. The processor 439 may map the plurality of designated regions to respective surfaces of the verified polyhedron.

According to an embodiment, the processor 439 may render an image located on the polyhedron. The processor 439 may display at least part of the rendered image on the display 437.

According to an embodiment, the processor 439 may determine an FOV based on the line of sight of the user, sensed through the sensing module 435. According to an embodiment, the processor 439 may display an image corresponding to the determined FOV in the rendered image on the display 437.

According to an embodiment, the processor 439 may transmit information about the determined FOV to the first electronic device 420. The first electronic device 420 may transmit, for example, an image corresponding to a request for receiving an image and the FOV. The request for receiving the image may be, for example, a request corresponding to information indicating an image generated based on a polygon according to a state of the second electronic device 430.

Figure 11A:
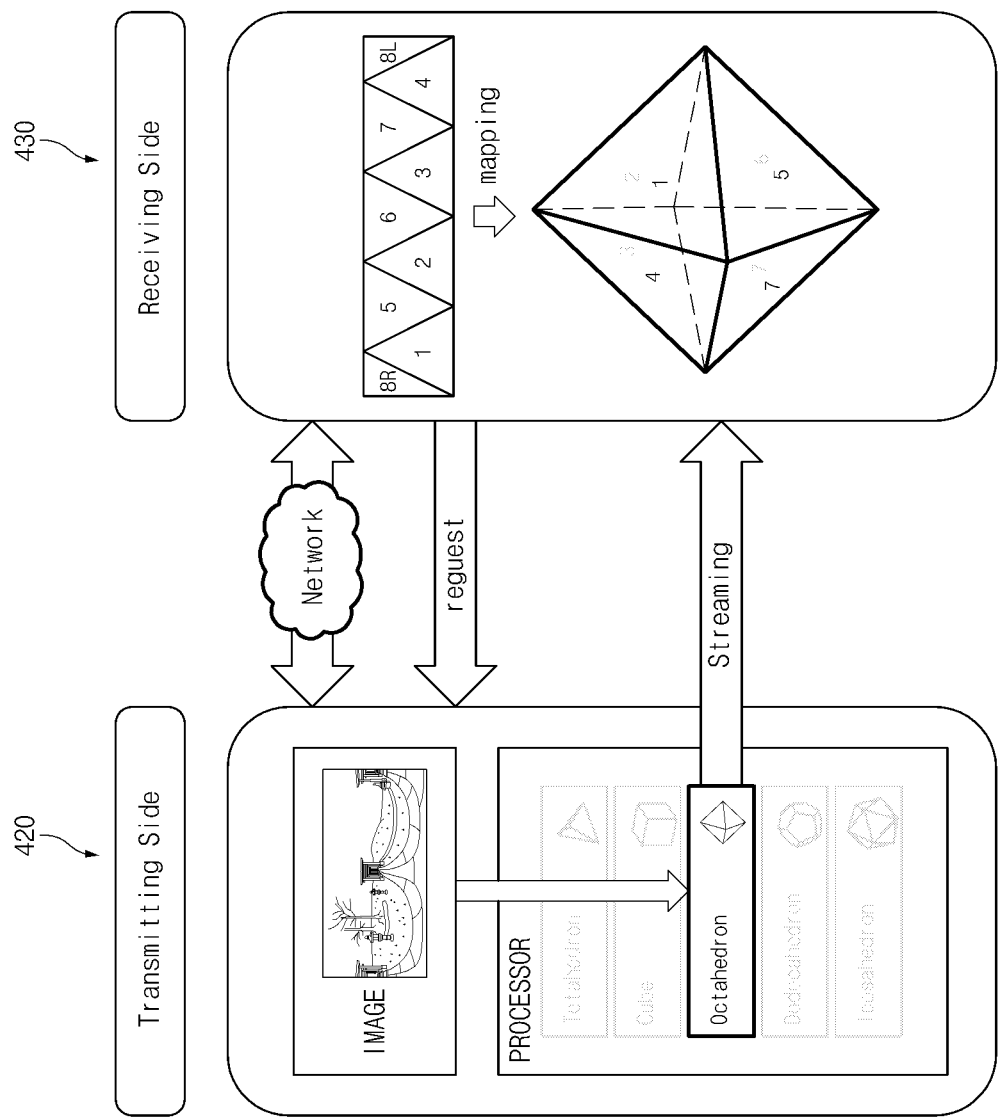
FIGS. 11A and 11B are diagrams illustrating an example method for generating a polyhedron projection (PHP) image from an ERP image and transmitting the generated PHP image to a second electronic device at a first electronic device according to an example embodiment of the present disclosure.
Figure 11B:
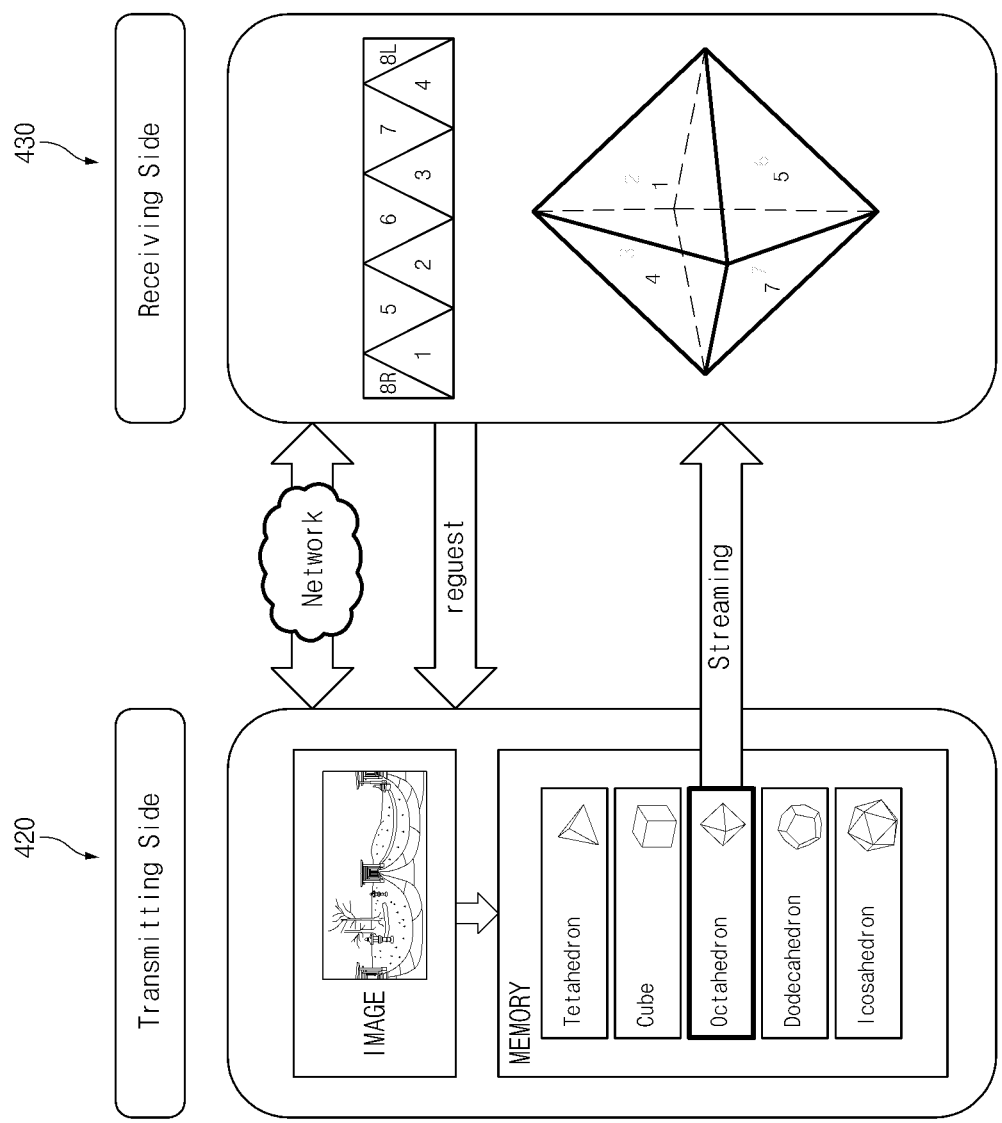

FIGS. 11A and 11B are diagrams illustrating an example method for generating a PHP image from an ERP image and transmitting the generated PHP image to a second electronic device at a first electronic device according to an example embodiment of the present disclosure.

Referring to FIG. 11A, a first electronic device 420 (e.g., a server 106 of FIG. 1) and a second electronic device 430 (e.g., an electronic device 101, an electronic device 102, or an electronic device 104 of FIG. 1) may be connected to a network (e.g., a network 162 or wireless communication 164 of FIG. 1). The first electronic device 420 and the second electronic device 430 may transmit and receive data over the network.

According to an embodiment, the second electronic device 430 may verify its state information. For example, the second electronic device 430 may verify state information of a resource (e.g., a memory 433 or a processor 439 of FIG. 10) which processes the image (e.g., an ERP image).

For another example, the second electronic device 430 may verify information about a state where the second electronic device 430 is connected to the network.

According to an embodiment, the second electronic device 430 may select information indicating an image generated based on a polyhedron, depending on the verified state information. For example, the second electronic device 430 may select a type of the polyhedron based on a state of a resource which processes an image. For example, if the processor 439 processes a relatively large amount of data or data of a specified reference amount or more, the second electronic device 430 may receive a small-capacity image from the first electronic device 420. Alternatively, if the processor 439 processes a large amount of data, the second electronic device 430 may select a polyhedron including a few surfaces. For another example, if the processor 439 processes a relatively small amount of data or data of less than the specified reference amount, the second electronic device 430 may receive a large-capacity image from the first electronic device 420. Alternatively, if the processor 439 processes a small amount of data, the second electronic device 430 may select a polyhedron including a large number of surfaces. For another example, the second electronic device 430 may select a type of the polyhedron based on a state where the second electronic device 430 is connected to the network. For example, if a state where data is transmitted and received over a channel is not good (e.g., if a radio signal receive sensitivity is less than or equal to a specified value or if a data transmission rate provided from the network is less than or equal to a specified value), the second electronic device 430 may select a polyhedron including a small number of surfaces. For another example, if a state where data is transmitted and received over the channel is good, the second electronic device 430 may select a polyhedron including a large number of surfaces.

According to an embodiment, the second electronic device 430 may transmit a request corresponding to the selected information to the first electronic device 420. For example, the request may include information about a polyhedron corresponding to the selected information.

According to an embodiment, the first electronic device 420 may receive the request and may generate an image corresponding to the request. For example, the first electronic device 420 may map an omnidirectional image to a polyhedron corresponding to the request to generate a PHP image. According to an embodiment, the first electronic device 420 may generate metadata corresponding to the generated PHP image. The metadata may include information for mapping the PHP image to a 3D space. According to an embodiment, the first electronic device 420 may transmit the generated PHP image and the generated metadata to the second electronic device 430.

According to an embodiment, the second electronic device 430 may receive the generated image and the generated metadata. According to an embodiment, the second electronic device 430 may map the image to a 3D space using the metadata to render the image. For example, the second electronic device 430 may map a PHP image to a polyhedron corresponding to metadata to render the PHP image. According to an embodiment, the second electronic device 430 may render an image mapped to the polyhedron and may display the rendered image on a display 437 of FIG. 10.

Thus, the second electronic device 430 may smoothly provide streaming of an omnidirectional image (or a video image) by changing a polyhedron to which an image is mapped, based on state information of the second electronic device 430 and receiving an image from the first electronic device 420.

Referring to FIG. 11B, the first electronic device 420 may generate images (e.g., PHP images) for all selectable polyhedrons and may store the generated images in a memory 423 of FIG. 4. For example, the first electronic device 420 may map an ERP image to all types of selectable polyhedrons before receiving a request of a PHP image from the second electronic device 430 to generate a plurality of PHP images (e.g., a tetrahedron projection (THP) image, a hexahedron projection (HHP) image, an OHP image, a decahedron projection (DHP) image, and an icosahedron projection (IHP) image) and may store the plurality of generated images in the memory 423.

According to an embodiment, when receiving a request corresponding to a selected image from the second electronic device 430, the first electronic device 420 may select the PHP image stored in the memory 423, corresponding to the request, and may transmit the selected PHP image to the second electronic device 430.

Thus, when receiving the request, the first electronic device 420 may quicker transmit a PHP image than generating a PHP image corresponding to the request and transmitting the generated PHP image to the second electronic device 430.

According to various embodiments described with reference to FIGS. 4 to 11B, the second electronic device 430 may efficiently receive an omnidirectional image by selecting information indicating an image based on state information of the second electronic device 430, transmitting a request corresponding to the selected information, and receiving an image corresponding to the request from the first electronic device 430.

FIGS. 12A, 12B, 12C, 12D and 12E are diagrams illustrating an example method for arranging an image reduced according to a level of detail (LOD) on a 2D plane at a first electronic device according to an example embodiment of the present disclosure.

Referring to FIGS. 12A to 12E, a first electronic device 420 of FIG. 4 may transmit an image to a second electronic device 430 of FIG. 4 using a field of view (FOV) received from the second electronic device 430.

Figure 12A:
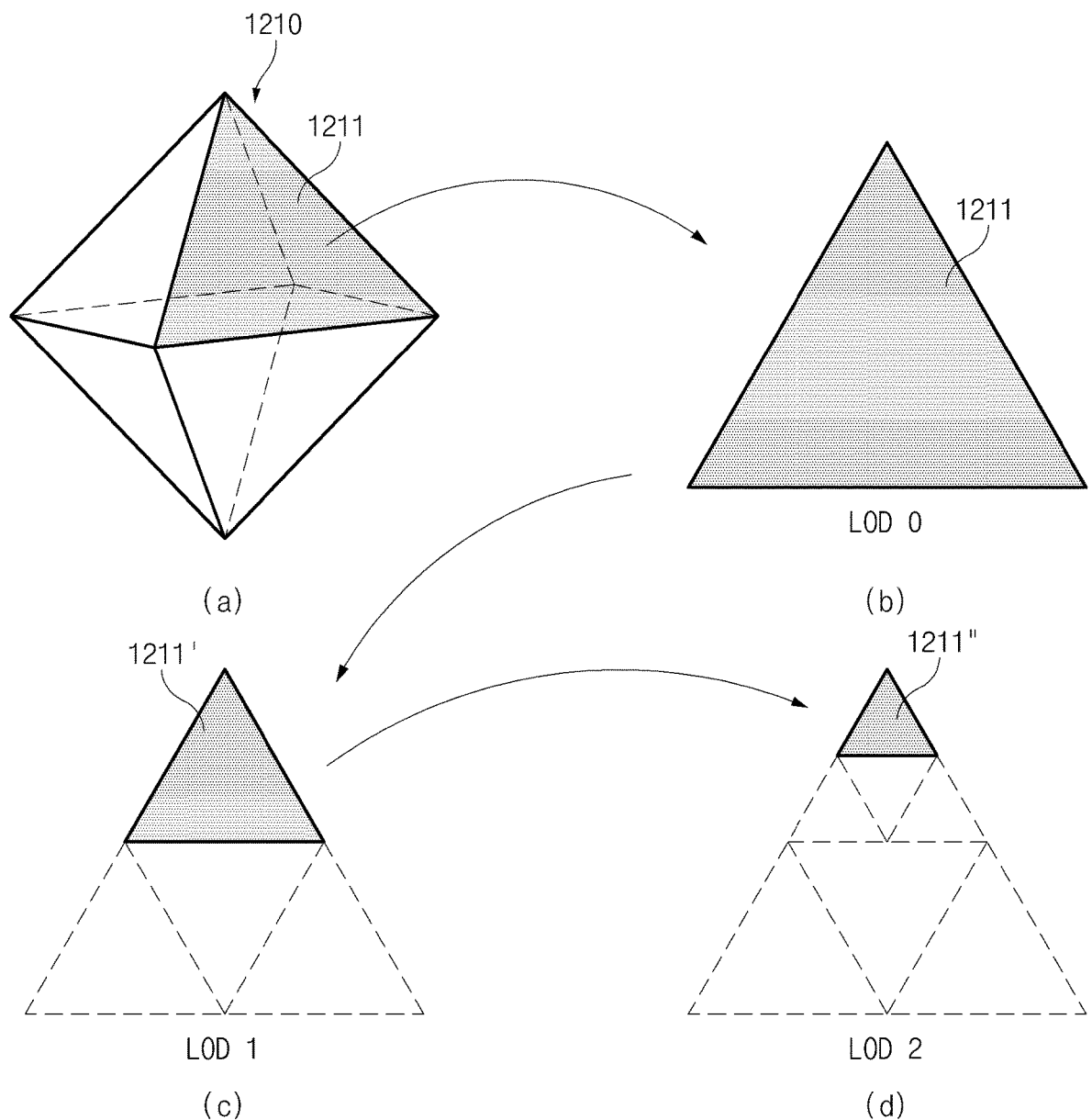
FIGS. 12A, 12B, 12C, 12D and 12E are diagrams illustrating an example method for arranging an image reduced according to a level of detail (LOD) on a 2D plane at a first electronic device according to an example embodiment of the present disclosure.

Referring to FIG. 12A, the first electronic device 420 may change an image mapped to a plurality of surfaces of a polyhedron depending on a specified LOD.

According to an embodiment, the first electronic device 420 may change a size of an image mapped to a plurality of surfaces of a polyhedron 1210 illustrated in (a) of FIG. 12A depending on a specified LOD. For example, the first electronic device 420 may determine a size of an image 1211 mapped on one surface of the polyhedron 1210 illustrated in (b) of FIG. 12A as LOD 0 and may sequentially reduce a size of an image 1211' of LOD 1 illustrated in (c) of FIG. 12A or a size of an image 1211" of LOD 2 illustrated in (d) of FIG. 12A. The image of LOD 1 illustrated in (c) of FIG. 12A may have, for example, a ¼ size compared with the image 1211 of LOD 0. The image 1211" of LOD 2 illustrated in (d) of FIG. 12A may have a ¼ size compared with the image 1211' of LOD 1.

Figure 12B:
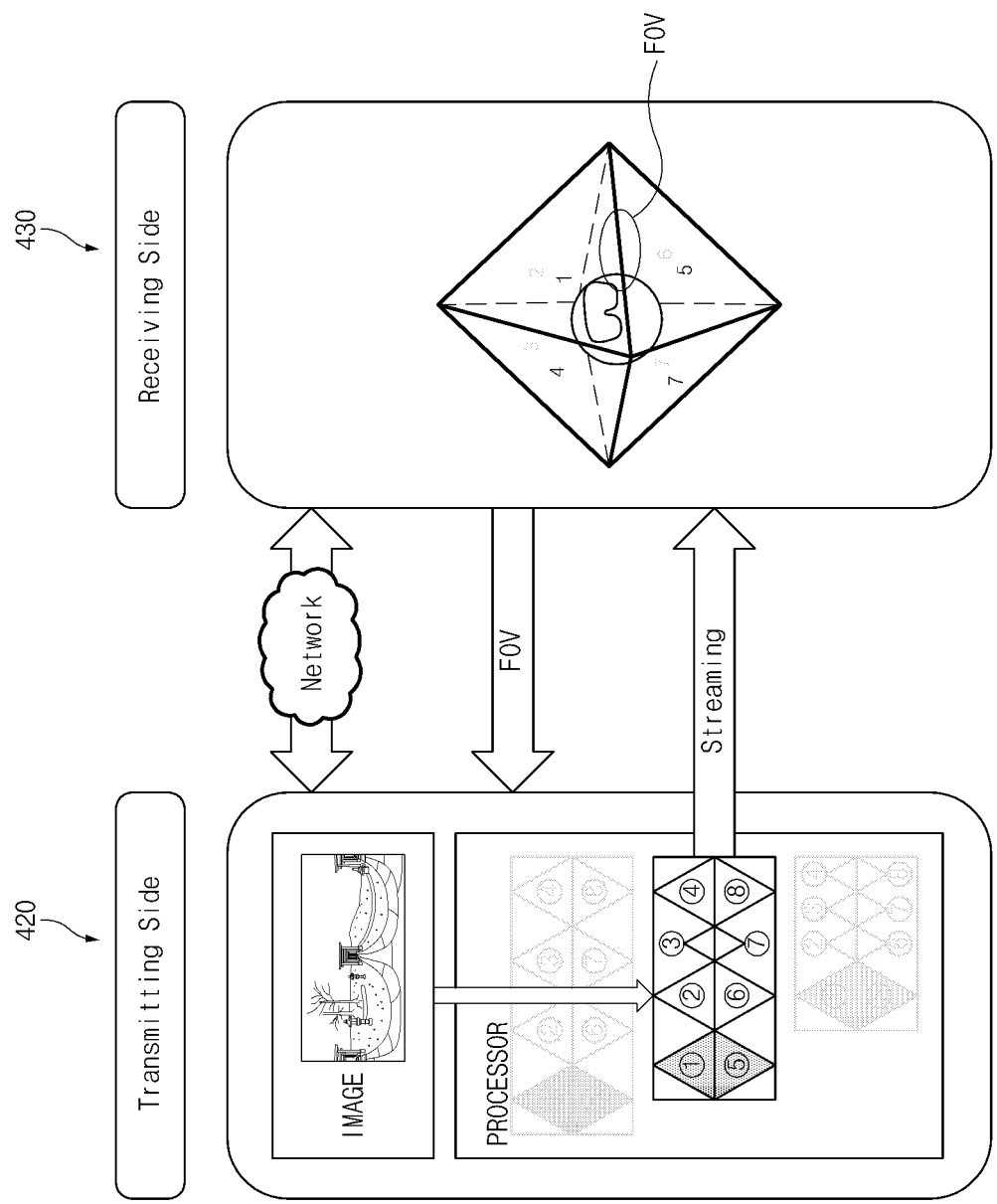

Referring to FIG. 12B, the first electronic device 420 may determine an LOD of an image mapped to a plurality of surfaces of a polyhedron.

According to an embodiment, the first electronic device 420 may determine a level (or an LOD) of the image mapped to the plurality of surfaces of the polyhedron based on an FOV. The second electronic device 430 may transmit an FOV determined based on a line of sight (or a focus) of a user to the first electronic device 420. The first electronic device 420 may determine a level of an image mapped to the polyhedron 1210 depending on the received FOV. For example, the first electronic device 420 may determine a level of an image mapped to a surface corresponding to the FOV as LOD 0 and may determine a level of an image mapped to the other surfaces as LOD 1. For example, as shown, if a region corresponding to the FOV is included in a first surface and a fifth surface, the first electronic device 410 may determine a level of an image of the first surface and the fifth surface as LOD 0 and may determine a level of an image mapped to the other surfaces as LOD 1. For another example, the first electronic device 420 may determine a level of a surface corresponding to an FOV as LOD 0 and may determine a level of a peripheral surface of the surface corresponding to the FOV as LOD 1, thus determining a level of another surface adjacent to the peripheral surface as LOD 2. As described above, the first electronic device 420 may perform image processing such that an LOD level increases as distant from the surface corresponding to the FOV.

According to an embodiment, the first electronic device 420 may determine a level of an image mapped to a plurality of surfaces of the polyhedron 1210 based on state information of the first electronic device 420. The first electronic device 420 may verify a connection state where the first electronic device 420 is connected to a network (e.g., a state of an established channel). The first electronic device 420 may determine a level of an image mapped to the polyhedron 1210 depending on the verified connection state. For example, if a state where data is transmitted and received over a channel is not smooth, the first electronic device 420 may decrease a level of an image located on another surface except for a surface corresponding to an FOV to LOD 1. For another example, if the state where the data is transmitted and received over the channel is smooth, the first electronic device 420 may fail to reduce an image located on another surface except for the surface corresponding to the FOV. As described above, the first electronic device 420 may change the number of the image 1211 of LOD 0 depending on a network state with the second electronic device 430 (e.g., increase the number of the image 1211 of LOD 0 as a network state is good).

Figure 12C:
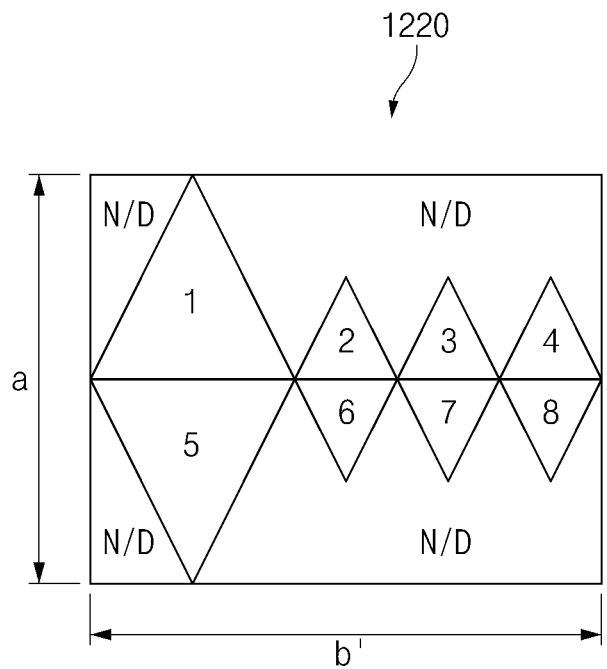

Referring to FIG. 12C, the first electronic device 420 may change an image mapped to the plurality of surfaces of the polyhedron 1210 depending on the determined LOD and may map the changed image to a 2D plane. For example, the first electronic device 420 may reduce an image (e.g., the image 1211' of LOD 1) of surfaces (e.g., a second surface, a third surface, a fourth surface, a sixth surface, a seventh surface, and an eighth surface) except for an image (the image 1211 of LOD 0) of the first surface and the fifth surface corresponding to the FOV. The first electronic device 420 may arrange an image of the first to fourth surfaces from the left to the right at an upper side of the a PHP image and may arrange an image of the fifth to eighth surfaces from the left and the right at a lower side of the PHP image. Thus, the first electronic device 420 may generate a PHP image 1220, a vertical length and a horizontal length of which are a and b'.

According to an embodiment, the horizontal length b' of the PHP image 1220 generated by the first electronic device 420 may be shorter than a PHP image 920 of FIG. 9B. The PHP image 1220 may include a no data region N/D at a higher rate than the PHP image 920 of FIG. 9B. Thus, the PHP image 1220 may include a small amount of image information. When the PHP image 1220 is encoded, high compression efficiency may be obtained.

According to another embodiment, the first electronic device 420 may arrange a reduced image to minimize and/or reduce a region where an image is not located. The first electronic device 420 may reduce image capacity by removing, for example, the no data region N/D.

Figure 12D:
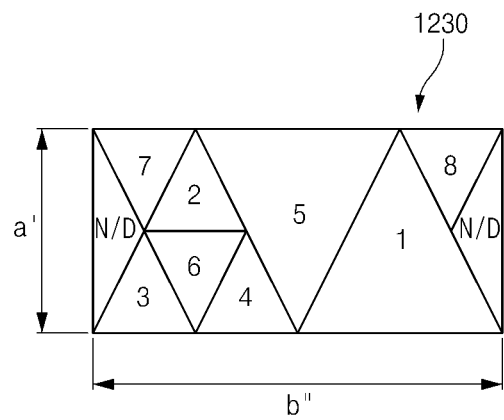

Referring to FIG. 12D, the first electronic device 420 may generate a PHP image 1230 such that a reduced image of an octahedron and an image which is not reduce are alternately located. Thus, the PHP image 1230 generated by the first electronic device 420 may decrease in the no data region N/D and may decrease to a vertical length a' and a horizontal length b" compared with the PHP image 1220 of FIG. 12C.

Figure 12E:
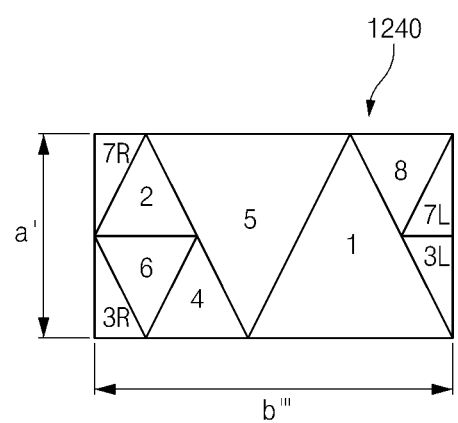

Referring to FIG. 12E, the first electronic device 420 may divide a reduced image and may alternately arrange the divided images to alternate with the other images to generate a PHP image 1240. Thus, the PHP image 1240 generated by the first electronic device 420 may be the same as the PHP image 1220 of FIG. 12D in the vertical length a', but may decrease to a horizontal length b'''.

Thus, the first electronic device 420 may efficiently transmit an omnidirectional image by decreasing an image mapped to a polyhedron using an FOV received from the second electronic device 430, based on state information of the first electronic device 420 and arranging the decreased image on a 2D plane to generate an image.

According to an embodiment, the second electronic device 430 may render a region including a region corresponding to an FOV in an image received from the first electronic device 420. The second electronic device 430 may refrain from (or, not)rendering a region which does not correspond to the FOV in the image received from the first electronic device 420. For example, the second electronic device 430 may map a region including the region corresponding to the FOV in the received image to a polyhedron. The second electronic device 430 may map a region including the region corresponding to the FOV among a plurality of regions of a received PHP image to a polyhedron. The second electronic device 430 may fail to map a region which does not correspond to the FOV among the plurality of image regions of the received PHP image to the polyhedron. The plurality of regions may correspond to a plurality of surfaces of a polyhedron generated based on a PHP image, respectively.

Figure 13:
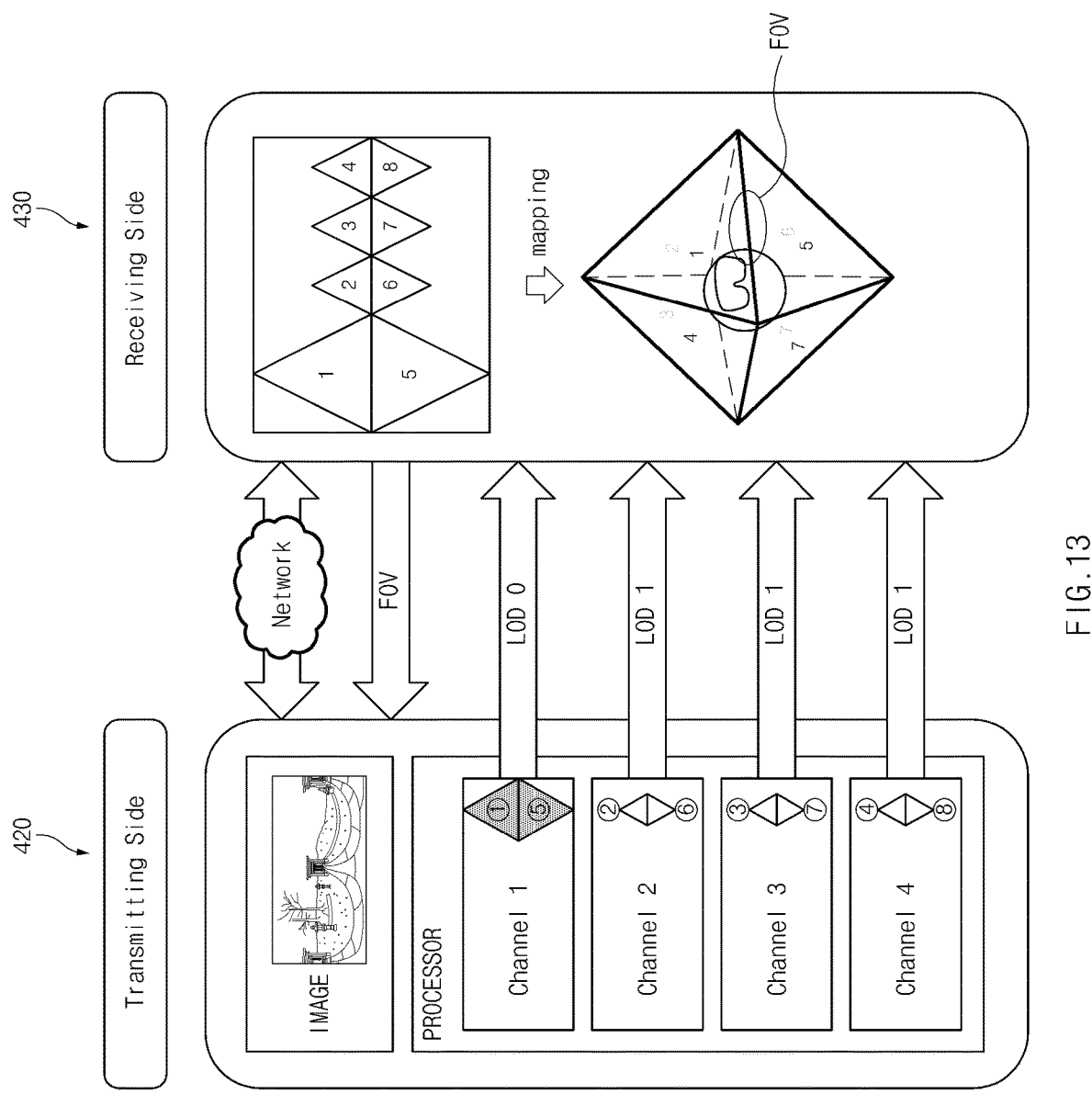
FIG. 13 is a diagram illustrating an example of transmitting an image generated according to an LOD over a multichannel at a first electronic device according to an example embodiment of the present disclosure.

FIG. 13 is a diagram illustrating an example of transmitting an image generated according to an LOD over a multichannel at a first electronic device according to an example embodiment of the present disclosure.

Referring to FIG. 13, a first electronic device 420 of FIG. 4 may establish a multichannel with a second electronic device 430 of FIG. 4 and may transmit an image to the second electronic device 430 over the established multichannel.

According to an embodiment, the first electronic device 420 may establish the multichannel with the second electronic device 430. The first electronic device 420 may transmit each of images to the second electronic device 430 over the multichannel.

According to an embodiment, the first electronic device 420 may transmit each of images mapped to a polyhedron over the multichannel. For example, the first electronic device 420 may transmit a plurality of image regions of a PHP image, respectively corresponding to images mapped to a plurality of surfaces of the polyhedron, over the multichannel. For example, the first electronic device 420 may transmit a plurality of regions of a PHP image, respectively corresponding to a plurality of surfaces (e.g., first to eighth surfaces) of an octahedron, to the second electronic device 430 over the multichannel.

According to an embodiment, the first electronic device 420 may transmit an image changed according to an LOD over the multichannel. For example, the first electronic device 420 may separate an image reduced according to an LOD (e.g., an image according to LOD 1) among images mapped to a polyhedron from an image which is not reduced (e.g., an image according to LOD 0) and may transmit the separated images over the multichannel. The first electronic device 420 may transmit, for example, an image region corresponding to an image mapped to the first surface and the fifth surface (or an image of LOD 0) among the plurality of surfaces of the octahedron over a first channel. The first electronic device 420 may transmit an image region corresponding to each of images mapped to the second to fourth surfaces and the sixth to eighth surfaces (or an image of LOD 1) over each of second to fourth channels.

According to an embodiment, the first electronic device 420 may verify its state information and may transmit each of images reduced according to an LOD over the multichannel. For example, the first electronic device 420 may verify state information of an established multichannel. The first electronic device 420 may transmit an image region corresponding to an image of LOD 0 over a channel in which a connection state where the first electronic device 420 is connected to a network is good in the verified multichannel and may transmit an image region corresponding to an image according to LOD 1 over a channel where a transmission and reception state is not good in the verified multichannel.

Figure 14:
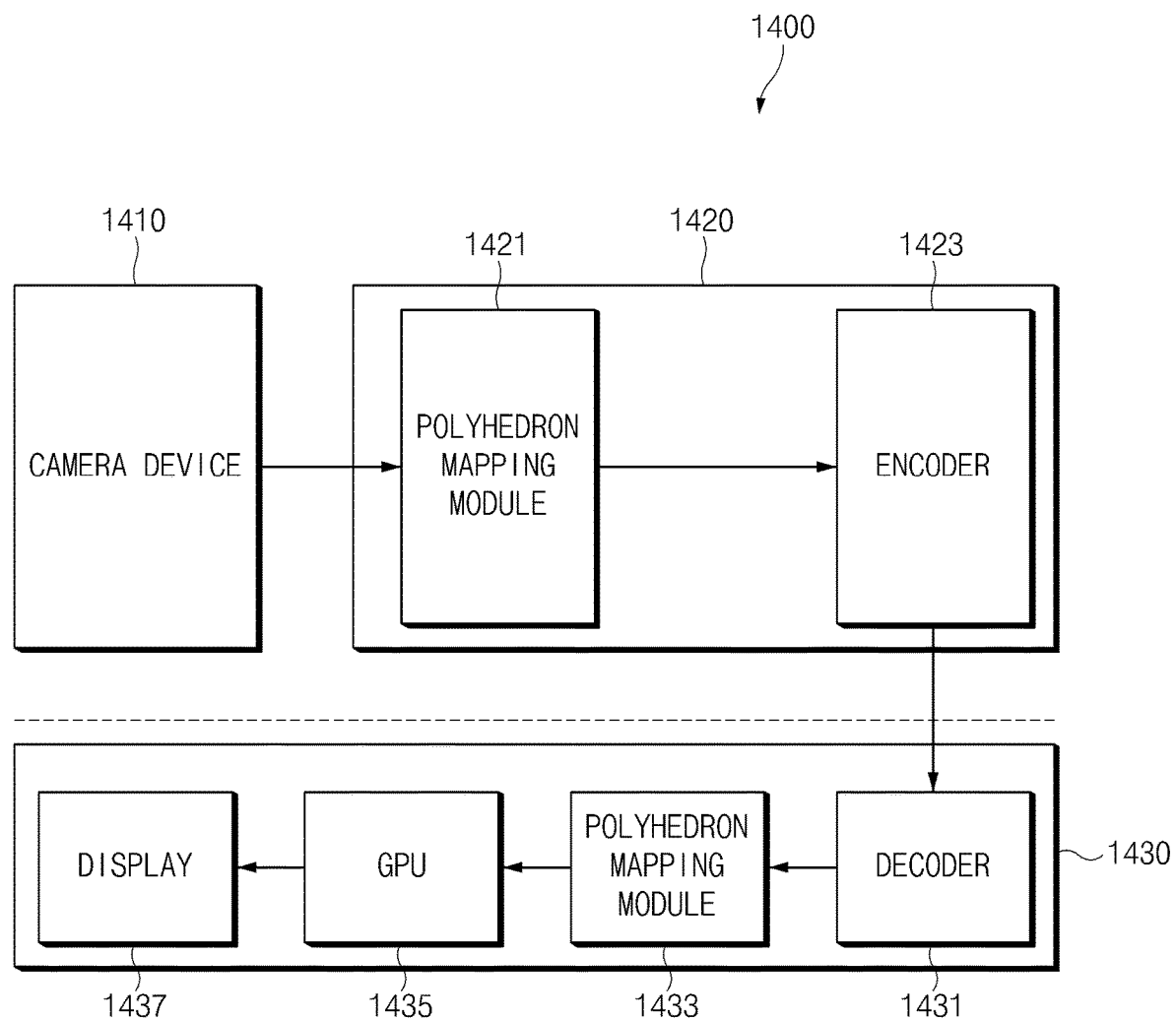
FIG. 14 is a block diagram illustrating an example image processing method of an image processing system according to an example embodiment of the present disclosure.

FIG. 14 is a block diagram illustrating an example image processing method of an image processing system according to an example embodiment of the present disclosure.

Referring to FIG. 14, in an image processing system 1400, a first electronic device 1420 (e.g., a server 106 of FIG. 1 or a first electronic device 420 of FIG. 4) may process an omnidirectional image collected by a camera device (e.g., including a camera/image capturing circuitry) 1410 (e.g., a camera device 410 of FIG. 4) and may provide the omnidirectional image to a user via a second electronic device 1430 (e.g., an electronic device 101 of FIG. 1, an electronic device 201 of FIG. 2 or a second electronic device 430 of FIG. 4). For example, the first electronic device 1420 may include a camera module and may perform an operation of the camera device 1410.

According to an embodiment, the camera device 1410 may omnidirectionally capture an image to generate an omnidirectional image (e.g., a fish eye image). The camera device 1410 may generate an ERP image using the omnidirectional image. According to an embodiment, the camera device 1410 may transmit at least one of the omnidirectional image and the ERP image to the first electronic device 1420.

According to an embodiment, a polyhedron mapping module (e.g., including processing circuitry and/or program elements) 1421 of the first electronic device 1420 may map the image received from the camera device 1410 to a polyhedron and may arrange the image mapped to the polyhedron on a 2D plane to generate a PHP image. The first electronic device 1420 may receive a request from the second electronic device 1430 and may arrange the received image on a polyhedron corresponding to the request to generate a PHP image. According to an embodiment, an encoder (e.g., including encoding circuitry and/or program elements) 1423 of the first electronic device 1420 may encode the generated PHP image. For example, the first electronic device 1420 may encode the generated PHP image in a specified encoding scheme (e.g., joint photographic coding experts group (JPEG), moving picture experts group (MPEG), or the like).

According to an embodiment, the first electronic device 1420 may generate metadata corresponding to the generated PHP image. The metadata may include, for example, information for mapping the PHP image to a 3D space. According to an embodiment, the first electronic device 1420 may transmit the encoded PHP image and the metadata to the second electronic device 1430.

According to an embodiment, a decoder (e.g., including decoding circuitry and/or program elements) 1431 of the second electronic device 1430 may receive and decode the encoded image from the first electronic device 1420. According to an embodiment, a polyhedron mapping module (e.g., including processing circuitry and/or program elements) 1433 of the second electronic device 1430 may map the decoded image to a polyhedron. For example, the polyhedron mapping module 1433 of the second electronic device 1430 may map the decoded PHP image to a polyhedron corresponding to the metadata using the received metadata. According to an embodiment, a graphic processing unit (GPU) 1435 of the second electronic device 1430 may render the image mapped to the polyhedron.

According to an embodiment, a display 1437 of the second electronic device 1430 may display the rendered image. For example, the display 1437 of the second electronic device 1430 may display a region corresponding to an FOV in the rendered image.

Figure 15:
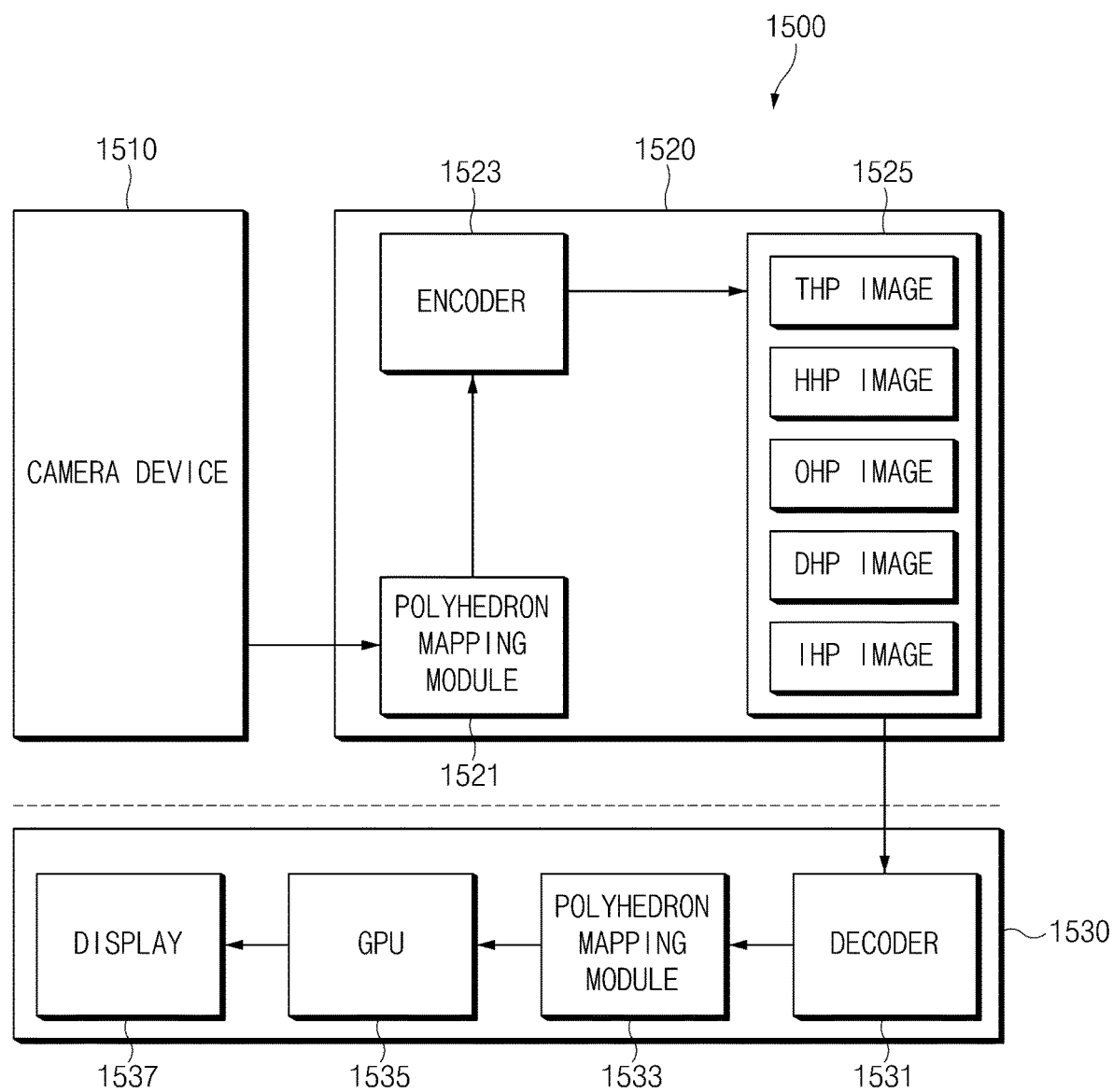
FIG. 15 is a block diagram illustrating an example image processing method of an image processing system according to an example embodiment of the present disclosure.

FIG. 15 is a block diagram illustrating an example image processing method of an image processing system according to an example embodiment of the present disclosure.

Referring to FIG. 15, an image processing system 1500, if an omnidirectional image collected by a camera device (e.g., including a camera/image capturing circuitry) 1510 (e.g., a camera device 410 of FIG. 4) is stored in a first electronic device 1520 (e.g., a server 106 of FIG. 1 or a first electronic device 420 of FIG. 4), the second electronic device 1530 (e.g., an electronic device 101 of FIG. 1, an electronic device 201 of FIG. 2, or a second electronic device 430 of FIG. 4) may receive and output an omnidirectional image stored in the first electronic device 1520 in a specified form depending on state information. For example, the image processing system 1500 may be similar to an image processing system 1400 of FIG. 14. Hereinafter, a description will be given of a difference with the image processing system 1400 of FIG. 14.

According to an embodiment, a polyhedron mapping module (e.g., including processing circuitry and/or program elements) 1521 of the first electronic device 1520 may receive an image from the camera device 1510, may map the received image to a polyhedron, and may arrange the image mapped to the polyhedron on a 2D plane to generate a PHP image. The first electronic device may generate PHP image for all selectable polyhedrons and may store the generated PHP images in a memory 1525. According to an embodiment, an encoder (e.g., including encoding circuitry and/or program elements) 1523 of the first electronic device 1520 may receive a request form the second electronic device 1530 and may encode a PHP image corresponding to the request. According to an embodiment, the first electronic device 1520 may generate metadata corresponding to the PHP image. The first electronic device 1520 may transmit the encoded image and the metadata to the second electronic device 1530.

According to an embodiment, a decoder (e.g., including decoding circuitry and/or program elements) 1531 of the second electronic device 1530 may receive the encoded image from the first electronic device 1520 and may decode the received encoded image. According to an embodiment, a polyhedron mapping module (e.g., including processing circuitry and/or program elements) 1533 and a GPU 1535 of the second electronic device 1530 may render the decoded image and may display the rendered image on a display 1537.

Figure 16:
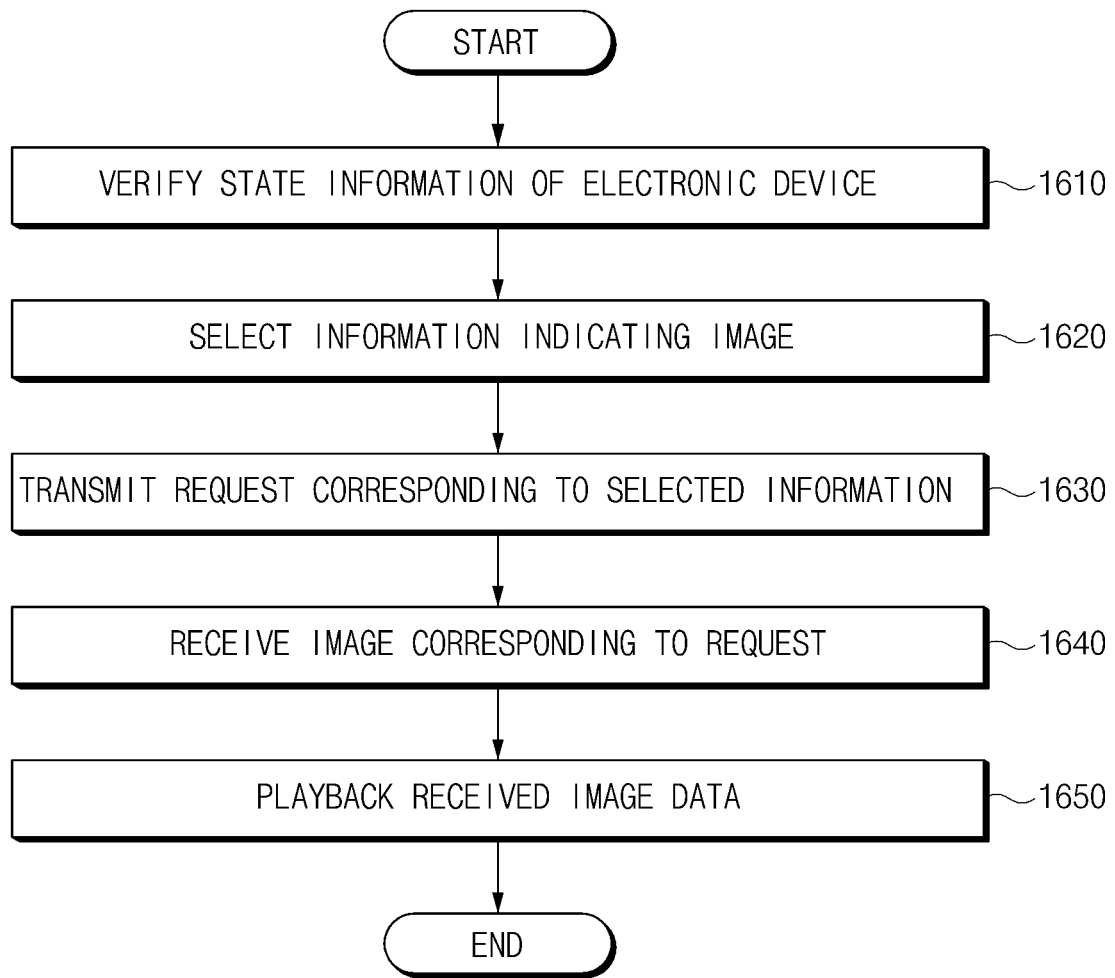
FIG. 16 is a flowchart illustrating an example control method for image processing of a second electronic device according to an example embodiment of the present disclosure.

FIG. 16 is a flowchart illustrating an example control method for image processing of a second electronic device according to an example embodiment of the present disclosure.

Operations illustrated in FIG. 16 may include operations processed by an image processing system 400 of FIG. 4. Thus, although there are contents omitted below, contents described about the image processing system 400 may be applied to the operations shown in FIG. 16 with reference to FIGS. 1 to 15.

According to an embodiment, in operation 1610, a second electronic device 430 of FIG. 10 (e.g., an electronic device 101 of FIG. 1 or an electronic device 201 of FIG. 2) may verify state information of the second electronic device 430. For example, a processor 439 of the second electronic device 430 may include state information of a resource which processes an image of the second electronic device 430 and information about a state where the second electronic device 430 is connected to a network. The processor 439 of the second electronic device 430 may verify, for example, a data throughput of a CPU (or a GPU) (e.g., an amount of data capable of being processed by the CPU or an amount of data currently processed by the CPU), decoding capability of the CPU, or a rendering capability of the CPU.

According to an embodiment, in operation 1620, the second electronic device 430 may select information indicating an image generated using a rendering scheme based on a polyhedron, depending on the verified state information. For example, the processor 439 of the second electronic device 430 may select a type of a polyhedron to which an omnidirectional image will be mapped, based on the verified state information to select information about an image generated based on the polyhedron. The selected information may include, for example, information about a polyhedron to which an omnidirectional image may be mapped.

According to an embodiment, in operation 1630, the second electronic device 430 may transmit a request corresponding to the selected information to the first electronic device 420. For example, the processor 439 of the second electronic device 430 may transmit the request for the selected information to the first electronic device 420. The request may include, for example, information about a PHP image included in the selected information.

According to an embodiment, in operation 1640, the second electronic device 430 may receive a PHP image corresponding to the request as a response to the received request from the first electronic device 420. For example, the processor 425 of the first electronic device 420 may receive the request from the second electronic device 430 and may transmit a PHP image mapped to a polyhedron corresponding to the request to the second electronic device 430. The processor 439 of the second electronic device 430 may receive the PHP image from the first electronic device 420.

According to an embodiment, in operation 1650, the second electronic device 430 may control playback of the received image. For example, the processor 439 of the second electronic device 430 may map the received PHP image to a polyhedron corresponding to the PHP image to render the image received from the first electronic device 420 and may display the rendered image on a display 437 of FIG. 10.

According to various embodiments, while receiving and outputting a first polyhedron image from the first electronic device 420 depending on a setting or a user input, the second electronic device 430 may receive and output a second polyhedron image (e.g., a polyhedron image having a relatively larger number of surfaces than the first polyhedron or a polyhedron image having a relatively smaller number of surfaces than the first polyhedron) depending on state information of a source which processes an image and state information of a network. For example, while receiving and outputting an octahedron image from the first electronic device 420, if at least one of state information of a resource which processes an image and state information of a network is worse than a previous state (e.g., if an amount of calculation of a CPU or GPU of the second electronic device 430 increases to a specified reference value or more, if a data transmission rate of the network more decreases than a previous state, or the like), the second electronic device 430 may automatically request the first electronic device 420 to transmit a tetrahedron image to receive the tetrahedron image and may output the received tetrahedron image. Alternatively, while receiving and outputting an octahedron image from the first electronic device 420, if at least one of state information of the resource and state information of the network is better than the previous state (e.g., if an amount of calculation of the CPU or GPU of the second electronic device 430 decreases to less than the specified reference value, if a data transmission rate of the network more increases than the previous state, or the like), the second electronic device 430 may automatically request the first electronic device 420 to transmit a decahedron or icosahedron image to receive the decahedron or icosahedron image and may output the received decahedron or icosahedron image.

The term "module" used in this disclosure may refer, for example, to a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include, for example, and without limitation, at least one of a dedicated processor, a CPU, an application-specific IC (ASIC) chip, a field-programmable gate array (FPGA), and a programmable-logic device for performing some operations, or the like, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include, for example, and without limitation, a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
a communication module comprising communication circuitry;
a memory configured to store first information indicating first image data generated using a first polyhedron projection rendering scheme based on a first polyhedron configured with a first number of flat surfaces to which at least a portion of an omnidirectional image is to be mapped and second information indicating second image data generated using a second polyhedron projection rendering scheme based on a second polyhedron configured with a second number of flat surfaces to which at least a portion of an omnidirectional image is to be mapped, the first number of flat surfaces being different than the second number of flat surfaces; and
a processor,
wherein the processor is configured to:
verify state information of the electronic device;
select one of the first information and the second information based at least on the state information, so as to select different numbers of flat surfaces for a corresponding polyhedron based on different respective determined states of the electronic device;
transmit a request corresponding to the selected information to an external electronic device via the communication module;
receive image data corresponding to the selected information between the first image data and the second image data from the external electronic device in response to the request; and
control playback of the received image data.

2. The electronic device of claim 1, wherein the processor is configured to:
verify the state information of the electronic device, including state information of at least one resource of the electronic device.

3. The electronic device of claim 1, wherein the processor is configured to:
verify the state information of the electronic device, including state information of a channel established through the communication module.

4. The electronic device of claim 1, further comprising:
a display,
wherein the processor is configured to:
display the image data on the display, as at least part of controlling the playback.

5. The electronic device of claim 1, wherein the processor is configured to:
verify a polyhedron corresponding to the received image data and verify a state where a plurality of surfaces of the polyhedron are located; and
assign the received image to a plurality of regions based on the state and play back the received image data by mapping the plurality of regions to the plurality of surfaces of the polyhedron, respectively, and rendering the received image data.

6. The electronic device of claim 5, further comprising:
a sensor configured to sense a line of sight of a user,
wherein the processor is configured to:
determine a field of view (FOV) based on the line of sight; and
render a region including a region corresponding to the FOV from among the plurality of regions and not render a region which does not correspond to the FOV from among the plurality of regions.

7. The electronic device of claim 5, wherein the processor is configured to:
establish a first communication channel and a second communication channel via the communication module;
receive a first region from among the plurality of regions over the first communication channel from the external electronic device; and
receive a second region from among the plurality of regions over the second communication channel from the external electronic device.

8. The electronic device of claim 1, wherein the processor is configured to:
receive metadata including information for mapping the received image data to a polyhedron from the external electronic device; and
map the received image data to the polyhedron using the metadata.

9. The electronic device of claim 8, wherein the metadata comprises information about the polyhedron corresponding to the received image data and information about a state where a plurality of surfaces of the polyhedron are located.

10. The electronic device of claim 1, further comprising:
a sensor configured to sense a line of sight of a user,
wherein the processor is configured to:
determine an FOV based on the line of sight;
transmit information about the FOV to the external electronic device via the communication module; and
receive image data corresponding to the request and the FOV.

11. An image providing method, the method comprising:
verifying state information of an electronic device;
selecting one of first information indicating first image data generated using a first polyhedron projection rendering scheme based on a first polyhedron configured with a first number of flat surfaces to which an omnidirectional image is to be mapped and second information indicating second image data generated using a second polyhedron projection rendering scheme based on a second polyhedron configured with a second number of flat surfaces to which an omnidirectional image is to be mapped, based on at least the state information, so as to select different numbers of flat surfaces for a corresponding polyhedron based on different respective determined states of the electronic device;

transmitting a request corresponding to the selected information to an external electronic device via a communication module of the electronic device;

receiving image data corresponding to the selected information among the first image data and the second image data from the external electronic device in response to the request; and controlling playback of the received image data.

12. The method of claim 11, wherein the verifying of the state information of the electronic device comprises:
verifying the state information of the electronic device, including state information of at least one resource of the electronic device.

13. The method of claim 11, wherein the verifying of the state information of the electronic device comprises:
verifying the state information of the electronic device, including state information of a channel established through the communication module.

14. The method of claim 11, wherein the controlling of the playback of the received image data comprises:
displaying the image data on a display of the electronic device, as at least part of controlling the playback.

15. The method of claim 11, wherein the controlling of the playback of the received image data comprises:
verifying a polyhedron corresponding to the received image data and verifying a state where a plurality of surfaces of the polyhedron are located; and
assigning the received image to a plurality of regions based on the state; and
playing back the received image data by mapping the plurality of regions to the plurality of surfaces of the polyhedron, respectively, and rendering the received image data.

16. The method of claim 15, further comprising:
determining an FOV based on a line of sight of a user,
wherein the playing back of the received image data by rendering the received image data comprises:
playing back the received image data by rendering a region including a region corresponding to the FOV from among the plurality of regions and not rendering a region which does not correspond to the FOV from among the plurality of regions.

17. The method of claim 15, further comprising:
establishing a first communication channel and a second communication channel, wherein the receiving of the image data from the external electronic device comprises:
receiving a first region from among the plurality of regions over the first communication channel from the external electronic device; and
receiving a second region from among the plurality of regions over the second communication channel from the external electronic device.

18. The method of claim 11, further comprising:
receiving metadata including information for mapping the received image data to a polyhedron from the external electronic device,
wherein the controlling of the playback of the received image data comprises:
playing back the received image data by mapping and rendering the received image data to the polyhedron using the metadata.

19. A non-transitory computer-readable storage medium storing a program which, when executed by a processor causes and electronic device to perform operations comprising:
verifying state information of an electronic device;
select one of first information indicating first image data generated using a first polyhedron projection rendering scheme based on a first polyhedron configured with a first number of flat surfaces to which at least a portion of an omnidirectional image is to be mapped and second information indicating second image data generated using a second polyhedron projection rendering scheme based on a second polyhedron configured with a second number of flat surfaces to which at least a portion of an omnidirectional image is to be mapped, based at least on the state information, so as to select different numbers of surfaces for a corresponding polyhedron based on different respective determined states of the electronic device;
transmitting a request corresponding to the selected information to an external electronic device via a communication module of the electronic device;
receiving image data corresponding to the selected information between the first image data and the second image data from the external electronic device in response to the request; and
controlling playback of the received image data.

20. The non-transitory computer-readable storage medium of claim 19, wherein the verifying of the state information of the electronic device comprises:
verifying the state information of the electronic device, including state information of at least one resource of the electronic device.

* * * * *